(12) United States Patent
Smith et al.

(10) Patent No.: US 11,711,268 B2
(45) Date of Patent: Jul. 25, 2023

(54) METHODS AND APPARATUS TO EXECUTE A WORKLOAD IN AN EDGE ENVIRONMENT

(71) Applicant: Intel Corporation, Santa Clara, CA (US)

(72) Inventors: Ned Smith, Beaverton, OR (US); Francesc Guim Bernat, Barcelona (ES); Sanjay Bakshi, Portland, OR (US); Katalin Bartfai-Walcott, El Dorado Hills, CA (US); Kapil Sood, Portland, OR (US); Kshitij Doshi, Tempe, AZ (US); Robert Munoz, Round Rock, TX (US)

(73) Assignee: INTEL CORPORATION, Santa Clara, CA (US)

( * ) Notice: Subject to any disclaimer, the term of this patent is extended or adjusted under 35 U.S.C. 154(b) by 6 days.

(21) Appl. No.: 16/723,760

(22) Filed: Dec. 20, 2019

(65) Prior Publication Data

US 2020/0167196 A1 May 28, 2020

Related U.S. Application Data

(60) Provisional application No. 62/939,303, filed on Nov. 22, 2019, provisional application No. 62/907,597, (Continued)

(51) Int. Cl.
*G06F 9/46* (2006.01)
*H04L 41/084* (2022.01)
(Continued)

(52) U.S. Cl.
CPC .......... *H04L 41/0843* (2013.01); *G06F 1/206* (2013.01); *G06F 9/4881* (2013.01);
(Continued)

(58) Field of Classification Search
CPC . H04L 41/0843; H04L 9/0637; H04L 9/3213; G06F 1/206; G06F 9/4881;
(Continued)

(56) References Cited

U.S. PATENT DOCUMENTS 3,226,675 A 12/1965 Edwards
5,826,239 A 10/1998 Du et al.
(Continued)

FOREIGN PATENT DOCUMENTS

WO 9859478 12/1998
WO WO 2017/100640 A1 * 6/2017 ............. H04L 29/08

OTHER PUBLICATIONS

Xu et al., University of Pittsburgh, Zenith: Utility-aware Resource Allocation for Edge Computing, 2007, 8 pages.*
(Continued)

*Primary Examiner* — Diem K Cao
(74) *Attorney, Agent, or Firm* — Hanley, Flight & Zimmerman, LLC

(57) ABSTRACT

Methods and apparatus to execute a workload in an edge environment are disclosed. An example apparatus includes a node scheduler to accept a task from a workload scheduler, the task including a description of a workload and tokens, a workload executor to execute the workload, the node scheduler to access a result of execution of the workload and provide the result to the workload scheduler, and a controller to access the tokens and distribute at least one of the tokens to at least one provider, the provider to provide a resource to the apparatus to execute the workload.

25 Claims, 17 Drawing Sheets

Related U.S. Application Data filed on Sep. 28, 2019, provisional application No. 62/841,042, filed on Apr. 30, 2019.

(51) Int. Cl.

| | |
|---|---|
| *H04L 41/0869* | (2022.01) |
| *H04L 49/00* | (2022.01) |
| *H04L 47/78* | (2022.01) |
| *H04L 41/5054* | (2022.01) |
| *G06F 9/48* | (2006.01) |
| *G06F 9/50* | (2006.01) |
| *G06F 9/54* | (2006.01) |
| *G06F 11/30* | (2006.01) |
| *H04L 9/06* | (2006.01) |
| *H04L 9/32* | (2006.01) |
| *G06F 1/20* | (2006.01) |
| *H04L 67/10* | (2022.01) |
| *H04W 4/08* | (2009.01) |
| *H04W 12/04* | (2021.01) |

(52) U.S. Cl.
CPC ............ *G06F 9/505* (2013.01); *G06F 9/5094* (2013.01); *G06F 9/542* (2013.01); *G06F 11/3006* (2013.01); *H04L 9/0637* (2013.01); *H04L 9/3213* (2013.01); *H04L 9/3247* (2013.01); *H04L 41/0869* (2013.01); *H04L 41/5054* (2013.01); *H04L 47/781* (2013.01); *H04L 49/70* (2013.01); *H04L 67/10* (2013.01); *H04W 4/08* (2013.01); *H04W 12/04* (2013.01); *G06F 2209/5021* (2013.01)

(58) Field of Classification Search
CPC ........ G06F 9/505; G06F 9/5094; G06F 9/542; G06F 11/3006
See application file for complete search history.

(56) References Cited

U.S. PATENT DOCUMENTS

| | | | |
|---|---|---|---|
| 5,941,947 A | 8/1999 | Brown et al. | |
| 6,185,491 B1 | 2/2001 | Gray et al. | |
| 6,363,417 B1 | 3/2002 | Howard et al. | |
| 6,377,860 B1 | 4/2002 | Gray et al. | |
| 6,437,692 B1 | 8/2002 | Petite et al. | |
| 6,460,082 B1 | 10/2002 | Lumelsky et al. | |
| 6,571,297 B1 | 5/2003 | Cline et al. | |
| 6,580,950 B1 | 6/2003 | Johnson et al. | |
| 6,626,607 B1 | 9/2003 | Hiramatsu et al. | |
| 6,636,505 B1 | 10/2003 | Wang et al. | |
| 6,735,630 B1 | 5/2004 | Gelvin et al. | |
| 6,832,251 B1 | 12/2004 | Gelvin et al. | |
| 6,859,831 B1 | 2/2005 | Gelvin et al. | |
| 6,889,188 B2 | 5/2005 | Metzler et al. | |
| 6,892,230 B1 | 5/2005 | Gu et al. | |
| 6,916,247 B2 | 7/2005 | Gatto et al. | |
| 6,948,168 B1 | 9/2005 | Kuprionas | |
| 6,963,784 B1 | 11/2005 | Gibbs | |
| 6,985,939 B2 | 1/2006 | Fletcher et al. | |
| 6,990,379 B2 | 1/2006 | Gonzales et al. | |
| 7,020,701 B1 | 3/2006 | Gelvin et al. | |
| 7,039,701 B2 | 5/2006 | Wesley | |
| 7,069,318 B2 | 6/2006 | Burbeck et al. | |
| 7,072,960 B2 | 7/2006 | Graupner et al. | |
| 7,143,139 B2 | 11/2006 | Burbeck et al. | |
| 7,159,007 B2 | 1/2007 | Stawikowski | |
| 7,167,920 B2 | 1/2007 | Traversat et al. | |
| 7,171,471 B1 | 1/2007 | Nair | |
| 7,177,929 B2 | 2/2007 | Burbeck et al. | |
| 7,181,536 B2 | 2/2007 | Burbeck et al. | |
| 7,185,342 B1 | 2/2007 | Carrer et al. | |
| 7,206,934 B2 | 4/2007 | Pabla et al. | |
| 7,207,041 B2 | 4/2007 | Elson et al. | |
| 7,251,689 B2 | 7/2007 | Wesley | |
| 7,263,560 B2 | 8/2007 | Abdelaziz et al. | |
| 7,283,811 B2 | 10/2007 | Gidron et al. | |
| 7,325,047 B2 | 1/2008 | Brittenham et al. | |
| 7,343,428 B2 | 3/2008 | Fletcher et al. | |
| 7,386,860 B2 | 6/2008 | Dani et al. | |
| 7,426,730 B2 | 9/2008 | Mathews et al. | |
| 7,472,349 B1 | 12/2008 | Srivastava et al. | |
| 7,519,918 B2 | 4/2009 | Trantow | |
| 7,599,827 B2 | 10/2009 | Hardwick et al. | |
| 7,603,469 B2 | 10/2009 | Fletcher et al. | |
| 7,797,367 B1 | 9/2010 | Gelvin et al. | |
| 7,822,860 B2 | 10/2010 | Brown et al. | |
| 7,844,687 B1 | 11/2010 | Gelvin et al. | |
| 7,933,945 B2 | 4/2011 | Krzyzanowski et al. | |
| 8,140,658 B1 | 3/2012 | Gelvin et al. | |
| 8,356,067 B2 | 1/2013 | Trantow | |
| 2002/0083143 A1 | 6/2002 | Cheng | |
| 2002/0112058 A1 | 8/2002 | Weisman et al. | |
| 2002/0143819 A1 | 10/2002 | Han et al. | |
| 2003/0005090 A1 | 1/2003 | Sullivan, Jr. et al. | |
| 2003/0036917 A1 | 2/2003 | Hite et al. | |
| 2003/0055624 A1 | 3/2003 | Fletcher et al. | |
| 2003/0061256 A1 | 3/2003 | Mathews et al. | |
| 2003/0065756 A1 | 4/2003 | Carrez | |
| 2003/0084156 A1 | 5/2003 | Graupner et al. | |
| 2003/0110334 A1 | 6/2003 | Lanigan et al. | |
| 2003/0163513 A1 | 8/2003 | Schaeck et al. | |
| 2003/0182394 A1 | 9/2003 | Ryngler et al. | |
| 2003/0191802 A1 | 10/2003 | Zhao et al. | |
| 2003/0217139 A1 | 11/2003 | Burbeck et al. | |
| 2004/0003033 A1 | 1/2004 | Kamen et al. | |
| 2004/0030740 A1 | 2/2004 | Stelting | |
| 2004/0221001 A1 | 11/2004 | Anagol-Subbarao et al. | |
| 2005/0108354 A1 | 5/2005 | Lisitsa et al. | |
| 2008/0244607 A1* | 10/2008 | Rysin .................. | G06Q 30/06 718/104 |
| 2012/0330711 A1* | 12/2012 | Jain ...................... | G06F 9/5072 709/224 |
| 2013/0212212 A1 | 8/2013 | Addepalli et al. | |
| 2014/0298349 A1* | 10/2014 | Jackson ................ | G06F 1/329 718/104 |
| 2016/0085594 A1 | 3/2016 | Wang et al. | |
| 2019/0319861 A1* | 10/2019 | Pan ...................... | H04L 9/0637 |
| 2020/0186607 A1* | 6/2020 | Murphy ................ | H04W 4/24 |

OTHER PUBLICATIONS

Wikipedia, "Edge Computing," retrieved from https://en.wikipedia.org/wiki/Edge_computing, Nov. 13, 2019, (4 pages).

Wikipedia, "Metcalfe's law," retrieved from https://en.wikipedia.org/wiki/Metcalfe%27s_law, Nov. 5, 2019, (4 pages).

Johnny Bennett, "Sarnoff's Law," retrieved from protocoldigital.com/blog/sarnoffs-law/, Dec. 2, 2013, (7 pages).

Samuel M. Smith, "Meta-Platforms and Cooperative Network-of-Networks Effects," retrieved from https://medium.com/selfrule/meta-platforms-and-cooperative-network-of-networks-effects-6e61eb15c586, Mar. 25, (44 pages).

Wikipedia, "Micropayment," retrieved from https://en.wikipedia.org/wiki/Micropayment, Nov. 5, 2019, (5 pages).

Samuel M. Smith, "Meta-Platforms and Cooperative Network-of-Networks Effects," retrieved from https://medium.com/selfrule/meta-platforms-and-cooperative-network-of-networks-effects-6e61eb15c586, Mar. 25, 2019, (44 pages).

\* cited by examiner

METHODS AND APPARATUS TO EXECUTE A WORKLOAD IN AN EDGE ENVIRONMENT

RELATED APPLICATIONS

This patent claims the benefit of U.S. Provisional Patent Application Ser. No. 62/841,042, which was filed on Apr. 30, 2019, U.S. Provisional Patent Application Ser. No. 62/907,597, which was filed on Sep. 28, 2019, and U.S. Provisional Patent Application Ser. No. 62/939,303, which was filed on Nov. 22, 2019. U.S. Provisional Patent Application Ser. No. 62/841,042, U.S. Provisional Patent Application Ser. No. 62/907,597, and U.S. Provisional Patent Application Ser. No. 62/939,303 are hereby incorporated herein by reference in their respective entireties. Priority to U.S. Provisional Patent Application Ser. No. 62/841,042, U.S. Provisional Patent Application Ser. No. 62/907,597, and U.S. Provisional Patent Application Ser. No. 62/939,303 is hereby claimed.

FIELD OF THE DISCLOSURE

This disclosure relates generally to edge environments, and, more particularly, methods and apparatus to execute a workload in an edge environment.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In some examples, an edge environment can include an enterprise edge in which communication with and/or communication within the enterprise edge can be facilitated via wireless and/or wired connectivity. The deployment of various Edge, Fog, multi-access edge computing (MEC), and Internet of Things (IoT) networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices.

Edge environments (e.g., Edge, Fog, MEC, IoT, etc.) enable a workload execution (e.g., an execution of a machine learning model using input data) near an endpoint device (e.g., a user device) that requests execution of the workload. Edge environments may include infrastructure, such as an edge service, that is connected to (e.g., in communication with) cloud infrastructure, endpoint devices, or additional edge infrastructure via networks such as the Internet. Edge services may be closer in proximity to endpoint devices than cloud infrastructure, such as centralized servers.

Figure 1:
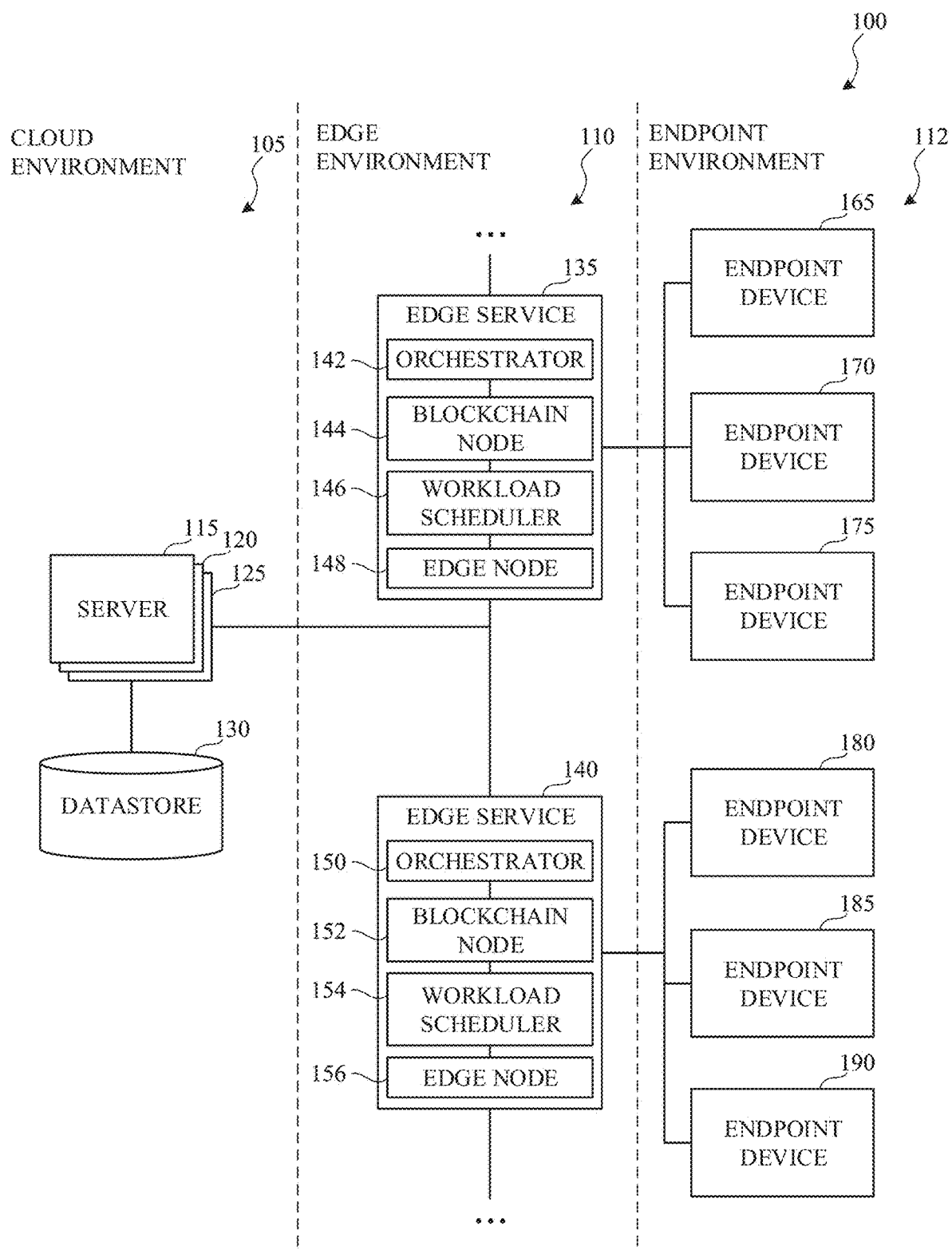
FIG. 1 depicts an example environment of use including an example cloud environment, an example edge environment to execute a workload, and an example endpoint environment.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The present techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. In some examples, these include environments in which network services are implemented or managed using multi-access edge computing (MEC), fourth generation (4G) or fifth generation (5G) wireless network configurations; or in wired network configurations involving fiber, copper, and other connections. In some examples, edge computing systems may include network architectures additional and/or alternative to MEC. Further, aspects of processing by the respective computing components may involve computational elements which are in geographical proximity of a user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving and/or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device (e.g., a user device) may request a nearby base station to compute a workload rather than a central server in a cloud environment. Edge environments include edge services (e.g., an edge platform for hire (EPH)), which include pools of memory, storage resources, processing resources, etc. In some examples, edge environments may include an edge as a service (EaaS), which may include one or more edge services. Edge services perform computations, such as an execution of a workload, on behalf of other edge services, edge nodes (e.g., EPH nodes), endpoint devices, etc. Edge environments facilitate connections between producers (e.g., workload executors, edge services, etc.) and consumers (e.g., other edge services, endpoint devices, etc.).

Because edge services may be closer in proximity to endpoint devices than centralized servers in cloud environments, edge services enable computations of workloads with lower latencies (e.g., response times) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment (e.g., via an EaaS, via an edge service, on an EPH node, etc.) include, but are not limited to, autonomous driving computations, video surveillance monitoring, machine learning model executions, and real time data analytics. Other examples of workloads to be executed in an edge environment include, but are not limited to, delivering and/or encoding media streams, measuring advertisement impression rates, object detection in media streams, speech analytics, asset and/or inventory management, and augmented reality processing.

In some examples, edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. Thus, an endpoint device may request an execution of a time-constrained workload from an edge service rather than a cloud server.

In some examples, edge services enable the distribution and decentralization of workload executions. For example, an endpoint device may request a first workload execution and a second workload execution. In some examples, a cloud server may respond to both workload execution requests. With an edge environment (e.g., by an EaaS platform), however, a first edge service may execute the first workload execution request, and a second edge service may execute the second workload execution request.

Additional infrastructure may be included in an edge environment to facilitate the execution of workloads on behalf of endpoint devices. For example, an orchestrator may access a request to execute a workload from an endpoint device and provide offers to a plurality of edge nodes. The offers may include a description of the workload to be executed and terms regarding energy and resource constraints. An edge node (e.g., an EPH node) may accept the offer, execute the workload, and provide a result of the execution to infrastructure in the edge environment and/or to the endpoint device.

Delivery of services in an Edge as a Service (EaaS) ecosystem (e.g., in an edge environment, via an EPH, via an edge infrastructure element, etc.) may include a business model where subscribers to the EaaS service (e.g., endpoint devices, user devices, etc.) pay for access to edge services. In some examples, the endpoint devices may pay for edge services (such as an execution of a workload) via micro-payments, credits, tokens, e-currencies, etc. In some examples, revenue models may include mobile network operators (MNOs) that maintain subscriptions from a subscriber base (such as one or more networks) as a way to pay for edge services by entering into service-level agreement (SLA) contracts. Accounting executed and/or managed by the MNO may determine billable services that are then applied to subscriber accounts.

In some examples, MNOs orchestrate workload scheduling and match-making (such as matching a subscriber seeking a service and an edge infrastructure and/or an edge node to provide the service) involving their subscribers and an ecosystem of edge services providers, while effecting various classes of service according to subscription levels of their customers. Such examples of MNO workload orchestration may include a highly centralized infrastructure for service and subscription phases, such as planning, provisioning, delivering, and regulating of these services, to monitoring and billing for consumption of the service. Such centralized infrastructure includes technical challenges such as a central point of failure, a central point of attack (e.g., by a hostile agent, endpoint device, and/or edge infrastructure elements), and a centralized institutional trust. In some examples, centralization of an infrastructure that provides subscriptions and services (such as an execution of a workload) may also limit the potential value of the edge network because such centralization can hinder peer to peer interactions.

Examples disclosed herein consider effects of using micro-transactions, e-currency, and workload contracts in edge environments (e.g., by an EaaS platform in an edge environment) as a form of immediate (or near immediate) payment in exchange for access to computational elements (e.g., to execute workloads). The execution engine (e.g., an edge node executing a workload) and/or the execution environment (e.g., an edge service) may, by default, not allow workload execution until a micro-payment is arranged in exchange for the execution of the workload. For example, an edge service or edge environment disclosed herein may not allow a workload to be executed until a micro-payment (e.g., tokens, an e-currency, etc.) is arranged in exchange for an execution of a workload and/or until a payment is contractually guaranteed by automated, transparent, and/or trustworthy payment flow mechanism (e.g., a blockchain and/or a central record system).

In some disclosed examples, payment for computing resources may be in the form of loans, exchanges, rebates, discounts, leases, credits, etc. For example, a first service owned by a first tenant may execute on an edge service owned by a second tenant. The execution may use an amount of time (e.g., computation time, processing time, etc.) and an amount of resources (e.g., processors, power, energy, etc.). The first tenant may provide tokens (or payment in any other suitable form) to the second tenant, and the second tenant may distribute the tokens or a portion of the tokens to compensate resource providers, such as an energy provider or an EPH provider, utilized by the second tenant. Examples disclosed herein enable payment for computational resources as needed in a granular fashion based on computing needs. For example, a tenant or endpoint device may pay an edge service at a workload, service, or function level conditional to the workload being performed or executed, rather than at a weekly, monthly, or yearly rate. In some examples, the tenant(s) may be an endpoint device (e.g., a user device), an edge service, a device in the edge environment, a device in the endpoint environment, and/or a device in the cloud environment.

In some examples, digital currencies such as Bitcoin and Ethereum may be used to pay for goods and services as an alternative to conventional forms of payment, such as fiat currency or credit cards. In some examples, micro-payments (such as micro-transactions, PayPal, M-Coin, Swish, Blendle) may provide deep integration into endpoint devices (such as a mobile phone, an Internet browser, a computer program, a computer application) to efficiently compensate digital and online purchases. In some examples, central processing unit (CPU) accounting mechanisms, such as those used for performance monitoring and telemetry collection (such as collection of energy telemetry and/or performance telemetry) may use efficient and scalable tracking capabilities built into microprocessors that include a fine grain monitoring of workload execution(s). In some examples, computer vendors may include soft stock-keeping unit (SoftSKU) capabilities and/or features that allow a hardware capability to be shipped in a disabled mode and enabled in the field following a receipt of an authorization token that chipset controllers use to unblock power rails to disabled IP blocks, as discussed below. Examples disclosed herein may combine digital currencies, micro-transactions, CPU accounting mechanisms, and/or SoftSKU capabilities to enable a scalable, granular (e.g., at a workload, service, and/or function level) payment as a condition of performing the workload (e.g., executing the workload). Examples disclosed herein may include an exchange of payment tokens as a condition for authorizing use of fine-grain partitions of hardware resources (e.g., compute engines, memory, communications, etc.) and/or soft assets (e.g., performance telemetry, power telemetry, energy scaling, etc.).

Examples disclosed herein include edge computing platforms (e.g., edge services) that enable the use of workload-specific (e.g., tenant-specific, edge node-specific, etc.) hardware and virtual resource partitioning combined with payment technologies such as micro-payments, e-currencies, credits, or tokens. In some examples, edge services accept micro-payments in exchange for performing an execution of a workload. An owner of an edge service may negotiate payment, and the payment may be expressed in the form of a count of tokens provided on-demand for workloads and functions that are to be executed. In some examples, energy and/or power may be included in resources acquired via micro-payments or tokens.

Examples disclosed herein expand an economic model based on a credit mechanism (e.g., a trade of tokens, an e-currency, a micro-payment, etc.) maintained in an edge environment. For example, a first owner may agree to grant a second owner access to a resource for an amount of time at an agreed cost. The cost may be based on a normalized capital expenditure (CAPEX) and/or an operating expenditure (OPEX) for the resources used during the amount of time, and/or on a number of tokens based on a projected demand of the resources. The agreement may be indicated with a contract (e.g., a service-level agreement (SLA), an e-contract, etc.) provided by the first owner and accepted by a second owner. In some examples, an owner may be an endpoint device, an edge service, or a device in the edge environment.

In some examples, the cost of resources is debited to a user of the resources (e.g., the second owner in the above example), and the exchange of payment may be used to access resources owned by the first owner executing services using the resources. The second owner may also exchange the credit with other owners to use other resources, such as energy resources owned by a third owner.

In some examples, the payment model (e.g., micro-payments, credits, tokens, e-currency, etc.) may follow an economic market model with dynamic demand, supply, and/or congestion-based determination of payments. Thus, providers (e.g., an endpoint device, an edge service, an EPH provider, an EaaS platform provider, an energy provider, etc.) may have an economic incentive to add computing capacity in an edge environment, such as within an EPH included in the edge environment. In some examples, providers may increase the computing capacity of edge services or include soft stock-keeping unit (SoftSKU) capabilities in edge services. SoftSKU capabilities enable hardware or software features of a computing device to be enabled or disabled during use. For example, an edge service may include a SoftSKU feature that enables and/or disables energy powering the edge service in response to commands from an authentication server.

In some examples, contracts (such as an SLA, a smart contract, and/or e-contract) stored in a blockchain may automate the workload execution bidding and agreement process. Decentralized trust and transparent flows of reputation payments (e.g., credits, tokens, etc.) may provide a basis for automated multi-party micro-transactions that facilitate a dynamic allocation of computing resources. Edge services and/or providers may also compensate for an inability to achieve a previously-agreed quality of service. For example, if an edge service and an endpoint device agree on a contract including a processing time term, and the edge service determines that the processing time term was not met, the edge service may refund a portion of tokens to the endpoint service. In some examples, devices in the edge environment monitor the supply and demand of workload computation requests and respond to changes via surge pricing or economic load balancing.

Prior to an execution of a workload, an edge service or a resource provider (e.g., processors, memory, energy, power, etc.) may be unavailable or provide limited access to resources to an endpoint device. An edge service or resource provider may enable the execution of workloads or use of resources in response to tokens exchanged (e.g., paid to an edge service, recorded on a blockchain, escrowed, etc.) by an endpoint device. In response to a proof of workload execution (e.g., a result of the execution provided, consensus by devices in the edge environment reached, an endpoint device providing receipt of execution completion, etc.), the tokens may be released by the third party escrow service.

In some examples, a contract enforces terms of service and payment details between devices, such as edge services and endpoint devices. For example, a contract (such as an SLA) may include an authorization to access a number of tokens from a wallet. In some examples, a blockchain may be maintained by at least one blockchain node, and the blockchain may include a contract involving an endpoint device requesting a workload execution and an edge service designated to execute the workload. In some examples, proof of contract establishment (such as verification of the contract in the blockchain) may be used to authorize a use of resources or an execution of a workload.

In some examples, edge services include resource director technology (RDT) capabilities and/or resource director technology extensions (RDT++) for planning and/or consideration of hardware and/or software resources. Resource director technology may enable capabilities such as ensuring an appropriate allocation or prioritization of hardware resources (e.g., cache capacities, energy management, memory bandwidth, etc.). In the use of an execution environment such as an EaaS platform and/or an edge environment, the orchestration of platform infrastructure may include an exercise of RDT and/or RDT++ capabilities and interfaces. Such capabilities and interfaces may be identified in a contract (e.g., an SLA, a smart contract, etc.) and hardware-signed telemetry logs included in a blockchain log and/or a blockchain node. Contracts may include terms regarding resource director technologies, and telemetry may be gathered by an edge service associated with resource usage. Telemetry may be provided by the edge service to a blockchain node to include in a blockchain. In some examples, a third party may verify terms of a contract were met by verifying signatures and/or telemetry stored on the blockchain (such as hash values on the blockchain, signatures of devices agreeing to terms of a contract, etc.) as well as signatures of parties involved in the contract. In some examples, verifying terms of a contract may confirm fidelity to established contracts. Hardware capabilities included in an edge service (e.g., INTEL® SOFTWARE GUARD EXTENSIONS, INTEL® TRUSTED EXECUTION TECHNOLOGY, etc.) may scale and protect the authenticity of contracts (e.g., a smart contract) while preserving decentralization of the edge environment and confidentiality of handling business data during an execution of a workload.

In some examples, the value of a network may be measured by the number of connections included in the network. The value of the network may increase (e.g., proportionally) relative to the number of connections that devices in the network maintain with other devices. In some such examples, edge environments enable a decentralized ecosystem that includes more connections than a centralized system. An edge ecosystem may include a rich, decentralized ecosystem that parallels the value chain inherent in networks of networks. For example, an edge environment may include a network comprised of multiple subnetworks, such as a network of networks. The value of a network of networks in an edge environment may be monetized by EaaS platforms, edge services, etc. within the edge environment. In some examples, edge services may include workloads alternative and/or additional to the computation of workloads. For example, an energy supplier may request a micro-payment token in exchange for supplying an energy resource. In another example, a radio transmitter may request tokens in exchange for transmitting data. Economics of supply and demand may include a direct impact in edge ecosystems to motivate efficiency gains in services (e.g., an efficiency gain in an execution of workloads) at lower costs.

In some examples, micro-payment models may be expressed as monetary costs and/or crediting schemes between edge tenants, such as devices in the edge environment. In an example involving a crediting scheme, the EPH tracks the crediting transactions that any pair of edge tenants have over time. For example, if a first tenant uses a resource provided by a second tenant (such as a CPU core or an energy resource) for a cost amount, then the EPH may add the cost amount (such as credits, tokens) to the second tenant, and the tokens may be provided from the first tenant. The second tenant may then use some or all of the tokens to pay for use of resources from the first tenant, and/or the second tenant may use the tokens as exchange for any resources the second tenant may access from a third tenant. The use of resources between tenants may be negotiated in accordance with policies implicit within the edge environment and/or explicitly negotiated among the first, second, and/or third tenants (e.g., via contracts, SLAB, etc.).

In examples disclosed herein, system architectures may include an edge node (such as an EPH node) capable of hosting and/or executing edge workloads in exchange for micro-payment tokens. In some examples, the edge workload execution environment (e.g., CPU(s), memory, communications, other resources, etc.) are unavailable by default, or may be available only to a limited degree (such as for boot-strapping negotiations). For example, an endpoint device may consume network bandwidth, computation of workloads, execution of workloads, and/or an initial amount of a service from an edge node for a low or free cost, and then the endpoint device may be required to pay the edge node for continuing use of such resources of the edge node. In some examples, when a required number of micro-payment tokens (e.g., a count of tokens) are escrowed with a contract (e.g., an SLA smart contract) as a form of e-payment, execution resources of the edge node are then applied for use by the endpoint device. In some examples, the tokens are released from escrow once proof of job completion is provided to the smart contract.

In some examples, the contract (such as an SLA, smart contract, e-contract, etc.) enforces the terms of service and payment details. For example, authorization to access the correct number of tokens from an endpoint device wallet (e.g., a wallet included in an endpoint device, a wallet maintained by a user device, etc.) may be defined in the contract. A blockchain (e.g., a blockchain node) may be used to create a contract that involves the subscriber (e.g., the endpoint device) and edge compute providers (e.g., an EaaS platform, edge nodes, EPH nodes, devices in an edge environment, etc.). An e-contract (e.g., an SLA, a contract, etc.) may establish an agreement containing terms of service and payment details for an execution of a workload. In some examples, proof of contract establishment may be required to authorize use of an execution environment, such as an EaaS platform, an EPH, an edge node, etc.

FIG. 1 depicts an example environment 100 of use including an example cloud environment 105, an example edge environment 110 to execute a workload, and an example endpoint environment 112. The cloud environment 105 includes a first example server 115, a second example server 120, a third example server 125, and an example datastore 130. The servers 115, 120, 125 may execute centralized applications (e.g., website hosting, data management, machine learning model applications, responding to requests from client devices, etc.). The datastore 130 may store information such as database records, website requests, machine learning models, and results of executing machine learning models.

While in the example of FIG. 1 there are three servers included in the cloud environment 105, the cloud environment 105 may include any number of servers. Likewise, while the cloud environment 105 includes one datastore, any number of datastores may be included in the cloud environment 105. The servers 115, 120, 125 may communicate to devices in the edge environment 110 and/or the endpoint environment 112 via a network such as the Internet. The datastore 130 may provide and/or store data records in response to requests from devices in the cloud environment 105, the edge environment 110, and/or the endpoint environment 112.

The edge environment 110 (e.g., an edge infrastructure) includes a first example edge service 135 and a second example edge service 140. In the illustrated example, the first edge service 135 corresponds to a first EPH and the second edge service 140 corresponds to a second EPH. The first edge service 135 includes an example orchestrator 142, an example blockchain node 144, an example workload scheduler 146, and an example edge node 148 corresponding to a first example EPH node. Similarly, the second edge service 140 includes an example orchestrator 150, an example blockchain node 152, an example workload scheduler 154, and an example edge node 156 corresponding to a second example EPH node. The edge services 135, 140 are in communication with each other and with the servers 115, 120, 125 in the cloud environment 105. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The edge services 135, 140 may execute workloads on behalf of devices located in the cloud environment 105, the edge environment 110, and/or the endpoint environment 112. The edge services 135, 140 may communicate with devices in the environments 105, 110, 112 (e.g., the first server 115, the datastore 130, etc.) via a network such as the Internet. Further, the edge services 135 may communicate with elements in the environments 105, 110, 112 wirelessly (e.g., via cellular communications, satellite communications, etc.). For example, the edge service 135 may be connected to (e.g., in communication with) a cellular base station included in the cloud environment 105 and connected to the first server 115. As used herein, the phrase "connected to," including variations thereof, encompasses direct communication and/or indirect communication between devices that are connected.

The endpoint environment 112 includes a first example endpoint device 165, a second example endpoint device 170, a third example endpoint device 175, a fourth example endpoint device 180, a fifth example endpoint device 185, and a sixth example endpoint device 190. In the example illustrated in FIG. 1, the first endpoint device 165, the second endpoint device 170, and the third endpoint device 175 are connected to the first edge service 135. Similarly, in the illustrated example, the fourth endpoint device 180, the fifth endpoint device 185, and the sixth endpoint device 190 are connected to the second edge service 140. However, the endpoint devices 165, 170, 175, 180, 185, 190 may be connected to any number of edge services, servers (e.g., the servers 115, 120, 125), and/or any other suitable devices included in the environments 105, 110, 112. For example, the first endpoint device 165 may be connected to the edge services 135, 140 and to the second server 120. Any of the endpoint devices 165, 170, 175, 180, 185, 190 may connect to devices in the environments 105, 110, 112 via a network such as the Internet. In some examples, the endpoint devices 165, 170, 175, 180, 185, 190 may be connected to one or more cellular base stations included one of the environments 105, 110, 112. For example, the first endpoint device 165 may be connected to a cellular base station included in the edge environment 110, and the cellular base station may be connected to the first edge service 135. Further, any number of endpoint devices may be included in the endpoint environment 112. In some examples, one or more of the endpoint devices 165, 170, 175, 180, 185, 190 may be a user device, such as a smartphone, a personal computer, a tablet, etc.

In response to a request to execute a workload from an endpoint device (e.g., the endpoint device 165), an orchestrator (e.g., the orchestrator 142) communicates with at least one edge node and an endpoint device to create a contract (e.g., an SLA) associated with a description of the workload to be executed. The endpoint device 165 provides a task associated with the contract and the description of the workload to the orchestrator 142, and the orchestrator 142 provides the task to a scheduler (e.g., the workload scheduler 146). The task may include the contract and the description of the workload to be executed. In some examples, the task may include tokens (such as a micro-payment, an e-currency) to acquire resources used to execute a workload. In some examples, the task may include a count of tokens to be provided in response to an execution of a workload.

A blockchain node (e.g., the blockchain node 144) maintains records and/or logs of actions occurring in the environments 105, 110, 112. In some examples, the blockchain node 144 may include a Merkle tree, and the blockchain node 144 may supply proof of delivery of a contract, bid, offer, result, etc., for parties involved in transactions, such as the endpoint device 165, the orchestrator 142, the edge node 148, and/or any devices included in the environments 105, 110, 112. For example, the edge node 148 may notify receipt of a workload description to the blockchain node 144. Any of the orchestrators 142, 150, the workload schedulers 146, 154, and/or the edge nodes 148, 156 may provide records of actions and/or tokens to the blockchain nodes 144, 152. For example, the orchestrator 142 may provide a record of receiving a request to execute a workload (e.g., a contract request provided by the endpoint device 165) to the blockchain nodes 144, 152. The blockchain nodes 144, 152 may be implemented as a centralized server in the cloud environment 105. Further, any device in the environment 100 (e.g., the endpoint device 165) may provide records and/or tokens to the blockchain nodes 144, 152. For example, an endpoint device 165 may accept a contract (such as an SLA, an e-contract, etc.) provided by the orchestrator 142 and provide a notice of contract acceptance to the blockchain node 144. In some examples, the blockchain node 144 may be implemented as a service hosted by a centralized server (e.g., the first server 115).

The workload scheduler 146 accesses a task from the orchestrator 142 and provides the task to the edge node 148. The edge node 148 executes the workload based on a description of the workload included in the task. The workload scheduler accesses a result of the execution of the workload and/or tokens from the edge node 148. The workload scheduler 146 provides the result to the endpoint device 165. In some examples, the workload scheduler 146 may retain a portion of the tokens accessed from the edge node 148 or provide the tokens to the orchestrator 142, the endpoint device 165, and/or resource providers.

The edge node 148 accesses a task from the workload scheduler 146 and executes a workload based on a description of the workload included in the task. The edge node 148 provides at least one result of the execution of the workload to the workload scheduler 146 and distributes tokens to resource providers, such as energy provider and/or an EPH provider. In some examples, an EPH provider may provide infrastructure services (e.g., maintenance, device support, datacenter services, space allocation, etc.) to an EPH node. In some examples, the edge nodes 148, 156 may provide tokens to the workload schedulers 146, 154 in response to determining that contract terms associated with an execution of a workload are not met. In some examples, in response to determining that contract terms are not met, the edge nodes 148, 156 may request additional tokens from the workload schedulers 146, 154, the orchestrators 142, 150, and/or the endpoint device 165.

In the example illustrated in FIG. 1, the orchestrator 142, the blockchain node 144, the workload scheduler 146, and the edge node 148 are included in the edge service 135. However, in some examples, the orchestrator 142, blockchain node 144, workload scheduler 146, and/or the edge node 148 may be included in the edge environment 110 rather than in the edge service 135. For example, the orchestrator 142 may be connected to the cloud environment 105 and/or the endpoint environment 112 outside of the edge service 135. In another example, the orchestrator 142, the blockchain node 144, the workload scheduler 146, and/or the edge node 148 is/are separate devices included in the edge environment 110. Further, any of the orchestrator 142, the blockchain node 144, the workload scheduler 146, or the edge node 148 may be included in the cloud environment 105 or the endpoint environment 112. For example, the orchestrator 142 may be included in the endpoint environment 112, or the blockchain node 144 may be included in the first server 115 in the cloud environment 105. In some examples, the workload scheduler 146 may be included in the orchestrator 142 rather than in the edge service 135. In some examples, the edge services 135, 140 may be distributed and performed among two or more peer devices (such as two or more edge servers) included in the edge environment 110.

An execution of a workload in the edge environment 110 may reduce computation costs and/or processing time used to execute the workload relative to an execution of the workload in the cloud environment 105. For example, an endpoint device may request an edge service to execute a workload at a cost lower than a cost needed to execute the workload in the cloud environment 105. In some examples, multiple edge services 135 may compete to receive a task to execute a workload, and each edge service may provide a bid including a workload execution cost to the orchestrator 142 and/or to the endpoint device 165. Each bid may include a different workload execution cost, and an edge service may lower a respective workload execution cost relative to other bids in order to be selected to execute the workload. Thus, a workload execution cost in the edge environment 110 may be lower than a workload execution cost in the cloud environment 105 provided by a centralized server (e.g., the first server 115).

In another example, an endpoint device may be nearer to an edge service than a centralized server in the cloud environment 105. For example, the edge service 135 is closer in proximity to the endpoint device 165 than the first server 115. As a result, the endpoint device 165 may request the edge service 135 to execute a workload, and the response time of the edge service 135 to deliver the executed workload result is lower than that of the first server 115 in the cloud environment 105.

Consistent with the examples provided herein, an endpoint device (e.g., one of the endpoint devices 165, 170, 175, 180, 185, 190) may be implemented as any type of endpoint component, device, appliance, or other thing capable of communicating as a producer or consumer of data. For example, an endpoint device can include a mobile phone, a laptop computer, a desktop computer, a processor platform in an autonomous vehicle, etc. In additional or alternative examples, an endpoint device can include a camera, a sensor, etc. Further, the label "platform," "node," and/or "device" as used in the environment 100 does not necessarily mean that such platform, node, and/or device operates in a client or slave role; rather, any of the platforms, nodes, and/or devices in the environment 100 refer to individual entities, platforms, nodes, devices, and/or subsystems which include discrete and/or connected hardware and/or software configurations to facilitate and/or use the edge environment 110.

In some examples, the edge environment 110 is formed from network components and functional features operated by and within the edge services 135 (e.g., the orchestrator 142, the blockchain node 144, the edge node 148, etc.). The edge environment 110 may be implemented as any type of network that provides edge computing and/or storage resources which are proximately located to radio access network (RAN) capable endpoint devices (e.g., mobile computing devices, IoT devices, smart devices, etc.), which are shown in FIG. 1 as the endpoint devices 165, 170, 175, 180, 185, 190. In other words, the edge environment 110 may be envisioned as an "edge" which connects the endpoint devices 165, 170, 175, 180, 185, 190 and traditional network access points that serves as an ingress point into service provider core networks, including mobile carrier networks (e.g., Global System for Mobile Communications (GSM) networks, Long-Term Evolution (LTE) networks, 5G and/or Sixth Generation (6G) networks, etc.), while also providing storage and/or compute capabilities. Other types and forms of network access (e.g., Wi-Fi, long-range wireless, wired networks including optical networks, etc.) may also be utilized in place of or in combination with such 3rd Generation Partnership Project (3GPP) carrier networks.

Figure 2:
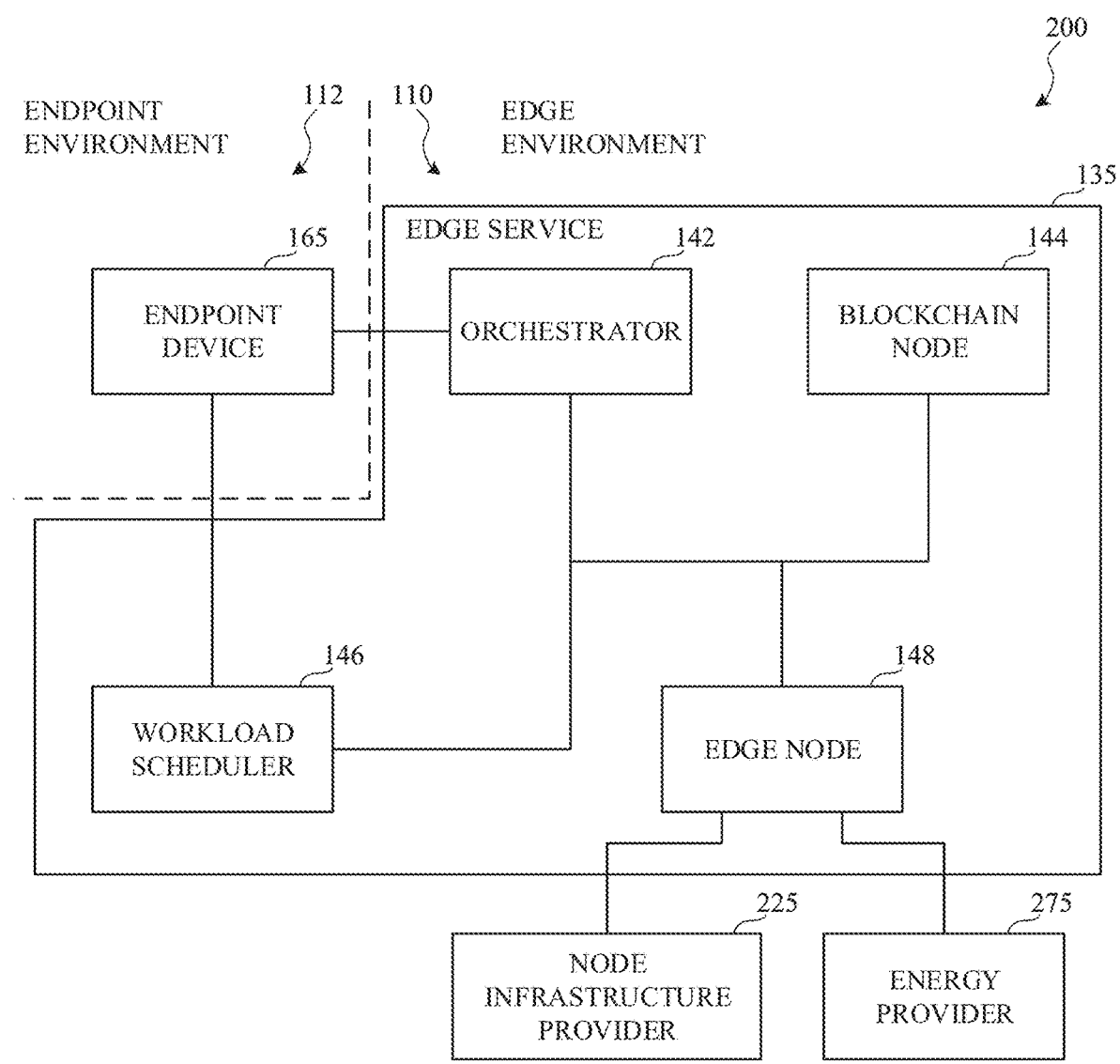
FIG. 2 depicts an example edge service and an example endpoint device included in the example environment of use of FIG. 1.

FIG. 2 depicts an example edge service 135 and an example endpoint device 165 included in the example environment 100 of use of FIG. 1. FIG. 2 includes an example environment 200 of use including the endpoint environment 112 and the edge environment 110. The endpoint environment 112 includes the endpoint device 165. In some examples, the endpoint device 165 may be a user device. The edge environment 110 includes the edge service 135 (e.g., an EPH), an example node infrastructure provider 225, and an example energy provider 275. The edge service 135 includes the orchestrator 142, the blockchain node 144, the workload scheduler 146, and the edge node 148. The endpoint device 165 is connected to the orchestrator 142 and to the workload scheduler 146. In the illustrated example, the endpoint device 165 requests execution of a workload by providing a request (e.g., a contract request, a description of a workload, etc.) to the orchestrator 142. After the execution of the workload, the endpoint device 165 accesses a result of the execution of the workload from the workload scheduler 146.

In the example of FIG. 2, the orchestrator 142, the blockchain node 144, the workload scheduler 146, and the edge node 148 are connected (e.g., in communication with each other) in the edge service 135. Any other connection/communication arrangement may additionally or alternatively be used. For example, the blockchain node 144 may be connected to only the edge node 148, or the blockchain node 144 may be included in the cloud environment 105 and connected to only the orchestrator 142. Further, as mentioned above, any of the orchestrator 142, the blockchain node 144, the workload scheduler 146, or the edge node 148 may be included outside of the edge service and instead be included in the cloud environment 105, the edge environment 110, or the endpoint environment 112. In some examples, devices in the edge environment 110 (such as the orchestrator 142, the workload scheduler 146, etc.) may communicate to other devices in the edge environment 110 via edge infrastructure. For example, the edge node 148 may access an offer from the orchestrator 142 and provide receipt of the offer to an element in the edge infrastructure. The edge infrastructure element may then provide the receipt of the offer to the blockchain node 144.

The edge node 148 (e.g., an EPH node) is connected to the node infrastructure provider 225 and to the energy provider 275. The node infrastructure provider 225 is an example of an EPH provider. The node infrastructure provider 225 of the illustrated example provides infrastructure services (e.g., maintenance, device support, datacenter services, space allocation, etc.) to the edge node 148. The energy provider 275 provides energy (e.g., power) to the edge node 148. The edge node 148 uses services provided by the node infrastructure provider 225 and/or the energy provider 275 to perform an execution of a workload. The edge node 148 may provide tokens to the providers (e.g., the node infrastructure provider 225, the energy provider 275, etc.) prior to and/or after executing a workload. For example, the edge node 148 may provide a token (such as a micro-payment, credits, and/or an e-currency) to the energy provider 275 to access energy used to execute a workload, then execute the workload, and then provide a token to the node infrastructure provider 225 in exchange for maintenance resources. In some examples, the edge node 148 may additionally and/or alternatively be connected to other providers, such as a storage provider.

While in the example of FIG. 2 there are two providers connected to the edge node 148, any number of providers may additionally and/or alternatively be connected to the edge node 148. For example, a third provider may be connected to the edge node 148 to provide network services (such as the ability to connect to the Internet). In some examples, the orchestrator 142, the blockchain node 144, the and/or the workload scheduler 146 may be connected to the providers 225, 275 to access resources. For example, the orchestrator 142 may be connected to a second node infrastructure provider that provides maintenance services for the orchestrator 142. In another example, the workload scheduler 146 may be connected to the energy provider 275 and provide tokens to the energy provider 275 before and/or after the workload scheduler 146 provides a result to the endpoint device 165. In some examples, any or all of the endpoint device 165, the orchestrator 142, the blockchain node 144, the workload scheduler 146, the edge node 148, the node infrastructure provider 225, and/or the energy provider 275 may include wallets to store e-currency (such as tokens, credits, micro-payments, etc.) and provide tokens to other devices in the environments 105, 110, 112. For example, the node infrastructure 225 may include a wallet to store tokens provided by the edge node 148 in exchange for resources to execute a workload. In another example, the endpoint device 165 (such as a user device) may include a wallet and provide tokens included in the wallet to the orchestrator 142, the workload scheduler 146, and/or the edge node 148 in exchange for executing a workload.

Figure 3:
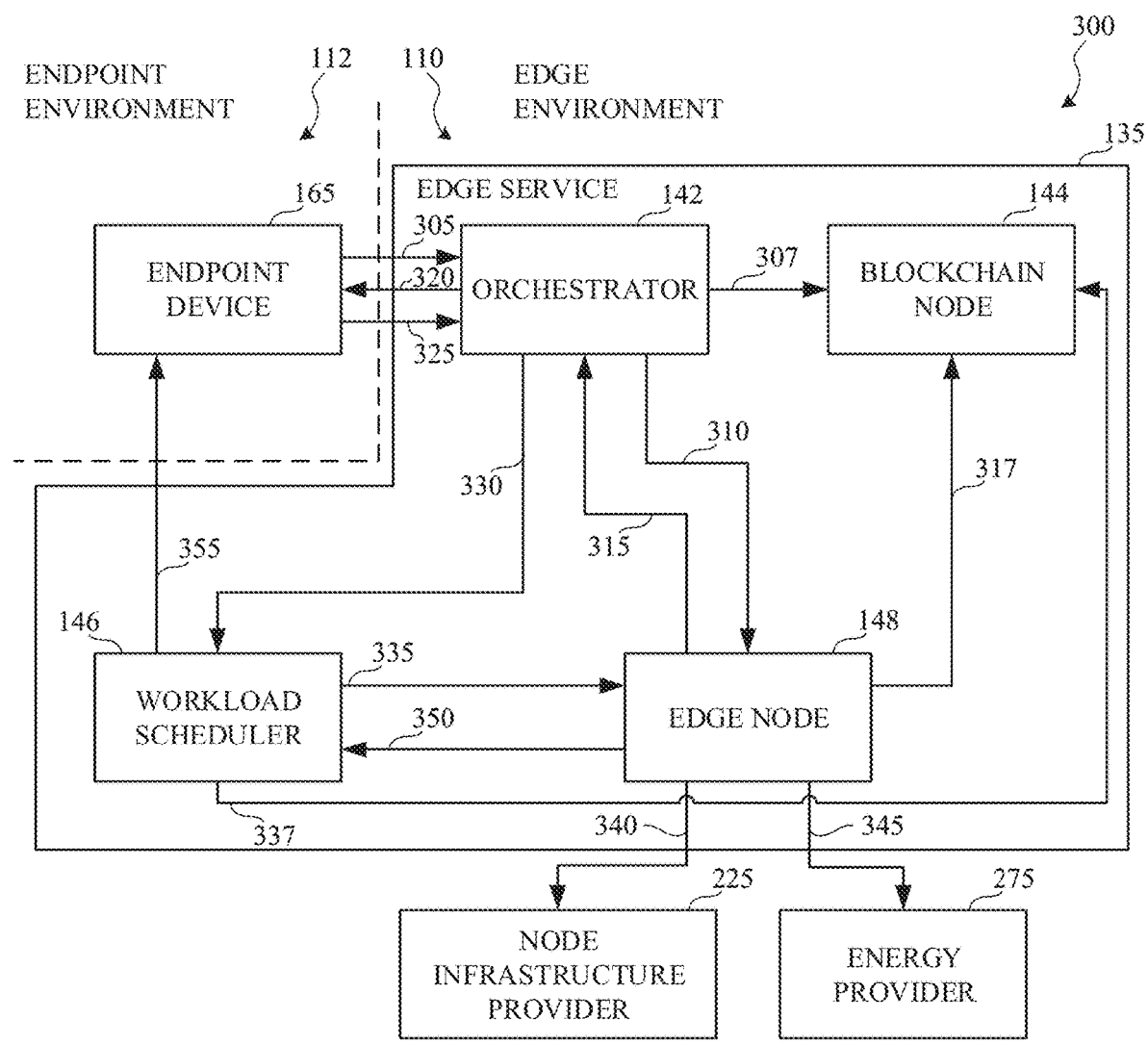
FIG. 3 illustrates example operations performed by the edge service and the endpoint device of FIG. 2 to execute a workload in the edge environment of FIG. 1.

FIG. 3 illustrates example operations performed by the edge service 135 and the endpoint device 165 of FIG. 2 to execute a workload in the edge environment 110 of FIG. 1. FIG. 3 includes an example environment 300 of use including the endpoint environment 112 and the edge environment 110. The endpoint environment 112 includes the endpoint device 165, and the edge environment 110 includes the edge service 135, the node infrastructure provider 225, and the energy provider 275. The edge service 135 includes the orchestrator 142, the blockchain node 144, the workload scheduler 146, and the edge node 148. In the example illustrated in FIG. 3, the orchestrator 142, the blockchain node 144, the workload scheduler 146, and the edge node 148 are included in an edge service. However, any of the orchestrator 142, the blockchain node 144, the workload scheduler 146, the edge node 148, the node infrastructure provider 225, and/or the energy provider 275 may be included in the edge environment 110 rather than in the edge service 135.

The endpoint device 165 requests execution of a workload by providing a request to the orchestrator 142. (Operation 305). The endpoint device 165, such as a user device, may request workload execution by providing a description of a workload, such as an executable data structure, metadata used to execute a workload, terms regarding performance targets and/or resource usage targets, etc. In some examples, the endpoint device 165 (such as a user application, a computer program, an executable, etc.) may request an SLA to have an application workload performed by an edge infrastructure, such as the edge node 148.

In some examples, the endpoint device 165 may provide a contract request (such as a request for an SLA and/or an e-contract) including contract terms. Contract terms may include terms regarding an amount of workloads to execute based on a cost to execute the workload(s), and contract terms may be accessed by the orchestrator 142 to generate contracts based on bids, offers, and/or counteroffers generated by the orchestrator 142 and/or the edge node 148. For example, contract terms may indicate that if a cost to execute a workload is a first token count (e.g., the edge node 148 provides an offer including a token count of two tokens to execute the workload), the orchestrator 142 may generate a contract including a workload description to execute one workload. Then, contract terms included in the contract request may indicate that if a cost to execute a workload is a second token count (e.g., the edge node 148 provides an offer including a token count of one token), the orchestrator 142 may generate a contract including a workload description to execute two workloads. In some examples, tokens may include a micro-payment, an e-currency, credits, and/or any suitable crediting model.

The orchestrator 142 may generate a contract (e.g., an SLA) including a count of workloads to be executed based on contract terms provided by the endpoint device 165 and/or offers provided by the edge nodes 148, 156. The endpoint device 165 may provide multiple descriptions of workloads to the orchestrator 142, and each description may be associated with a term included in the contract terms. For example, if a first term included in the contract terms is met by an offer provided by the edge node 148 such as an EPH node, the orchestrator 142 may generate a contract based on the first term to execute a first workload associated with the first term. If a second term included in the contract terms is met by an offer provided by the edge node 148, the orchestrator may generate a contract based on the second term to execute a second workload associated with the second term. Similarly, the orchestrator 142 may generate contracts to execute one or more portions of a workload based on contract terms provided by the endpoint device 165. The orchestrator 142 may provide a record of receipt of the request to the blockchain node 144. (Operation 307).

The orchestrator 142 generates at least one bid based on the request provided by the endpoint device 165 and distributes the at least one bid to the edge node 148. (Operation 310). The bid may include performance terms, resource terms, a count of tokens to be provided in response to an execution of a workload, and/or tokens to be used by the edge node 148 to execute the workload. In some examples, the orchestrator 142 may provide the bid to multiple edge nodes and/or distribute multiple bids to multiple edge nodes in the edge environment 110. In some examples, the orchestrator 142 may broadcast bids to various EPH nodes (such as the edge nodes 148, 156) in an edge infrastructure (such as the edge environment 110), the bids may include terms involving the resources, power, performance, and/or other requirements, as well as the number of tokens available to perform the workload tasks (such as to execute the workload based on the workload description). The orchestrator 142 may record the bid (or multiple bids) by providing the bid (or multiple bids) to the blockchain node 144. (Operation 307).

In the illustrated example, the edge node 148 generates an offer based on the bid and provides the offer to the orchestrator 142. (Operation 315). The offer may include the performance terms, resource terms, count of tokens, or tokens included in the bid. The offer may also include modified performance terms, modified resource terms, a modified count of tokens, and/or modified tokens, which are modified relative to their original counterparts included in the bid. For example, the edge node 148 may provide an offer to the orchestrator 142 that includes a modified count of tokens higher than the original count included in the bid. In some examples, the edge node 148 (such as an EPH node) evaluates the bid and makes an offer to satisfy a portion or all of the bid. A counteroffer may be made in terms of resources, power, etc. for a number of tokens.

Further, the edge node 148 may provide an offer associated with executing a portion of the workload. For example, the edge node 148 may provide an offer indicating a count of tokens fewer than a count included in a bid, with the offer indicating that the edge node 148 agrees to execute a portion (such as half, one third, one part) of the workload. In some examples, the edge node 148 may record receipt of a bid, provide the bid, and/or provide the offer to the blockchain node 144. (Operation 317).

In some examples, the operations in the bidding process (such as operations 315, 317) may occur multiple times such that the orchestrator 142 and the edge node 148 reach a consensus. For example, the bidding process may be facilitated by a publish-subscribe or a multi-cast model, wherein a group of edge nodes is notified of the possibility to make an offer based on a bid. Likewise, the edge nodes may provide offers using a publish-subscribe model to ensure a fair opportunity for each edge node to win the bid. To reach a consensus regarding a state of the execution process (e.g., a consensus in the edge environment 110 regarding which edge node will execute the workload), a blockchain messaging model may be used as a publisher. For example, the orchestrator 142 may notify bidders (e.g., edge nodes) that an offer has been accepted by providing the acceptance to the blockchain node 144.

The orchestrator 142 generates a contract based on the offer and provides the contract to the endpoint device 165. (Operation 320). In some examples, the orchestrator 142 may create multiple contracts associated with multiple offers accessed from at least one edge node. In some examples, the orchestrator 142 creates an SLA based on available offers (such as a contract based on offers provided by one or more of the edge nodes 148, 156). The endpoint device 165 accepts the contract and provides a task to the orchestrator 142. (Operation 325). In examples disclosed herein, a task includes a description of a workload to be executed. The edge node 148 accesses a task, then accesses the description of the workload included in the task, and then executes the workload based on the description. The task may include the contract, a description of a workload, tokens, and/or a count of tokens. In some examples, the endpoint device 165 may refuse to accept the contract and requests another contract from the orchestrator 142. In some examples, the endpoint device 165 (such as a user application, a computer program, a user device, etc.) provides a request to execute the workload based on contract terms (such as terms included in an SLA) and provides payment in the form of tokens. The orchestrator 142 may retain tokens in exchange for provided orchestration services.

The orchestrator 142 provides the task to the workload scheduler 146. (Operation 330). In some examples, the workload scheduler 146 may be included in the orchestrator 142, and the orchestrator 142 may perform the operations associated with the workload scheduler 146 discussed herein. In some examples, the orchestrator 142 may use the workload scheduler 146 to schedule various services, functions, and tasks as appropriate for the workload among the available EPH nodes (such as the edge nodes 148, 156). In some examples, the workload scheduler 146 may retain tokens as payment for scheduling services. In some examples, the workload scheduler 146 may retain tokens as authorized by the orchestrator 142. In some examples, the orchestrator 142 may provide receipt of the task and/or the task to the blockchain node 144. (Operation 307). In further examples, the orchestrator 142 may retain a portion of tokens included in the task in exchange for orchestration services, such as operations 307, 310, 320, 330.

The workload scheduler 146 provides the task to the edge node 148. (Operation 335). In some examples, an EPH node (such as the edge node 148) runs the portion of the workload (such as executes the workload based on a description of the workload) and receives tokens as payment. In some examples, the workload scheduler 146 may provide the task and/or receipt of the task to the blockchain node 144. (Operation 337). The edge node 148 distributes a portion of the tokens to the node infrastructure provider 225 (e.g., an EPH provider). (Operation 340). The edge node 148 distributes a portion of the tokens to the energy provider 275. (Operation 345). In some examples, the edge node 148 may distribute a portion of tokens to the providers 225, 275 after execution of a workload completes. In some examples, the edge node 148 (such as an EPH node) may distribute tokens to other provides who may administer and support the EPH node, such as the node infrastructure provider 225 and/or the energy provider 275.

The edge node 148 executes the workload and provides a result of the execution of the workload to the workload scheduler 146. (Operation 350). The task provided by the workload scheduler 146 includes a description of a workload to be executed, and the edge node 148 executes the workload based on the description. The workload description may include an executable program, an application, and/or machine readable instructions to be executed. The workload description may include an identifier corresponding to a location at which the edge node 148 may access an executable program or application to execute the workload. In some examples, the EPH returns one or more workload results and may refund tokens to compensate the workload scheduler 146, if appropriate. However, if the EPH node (such as the edge node 148) satisfied SLA performance and quality of service (QoS) requirements included in the contract (such as contract terms, SLA terms), the workload scheduler 146 may not impose a payment penalty on the edge node 148.

The edge node 148 may provide receipt of the task, receipt of the workload description, the result of the execution of the workload, and/or a record of providing the result to the workload scheduler 146 to the blockchain node 144. (Operation 317). In some examples, the edge node 148 may determine that terms of the contract were not met. In response to determining that terms of the contract were not met, the edge node 148 may refund a portion of the tokens included in the task to the workload scheduler 146, and/or the edge node 148 may request tokens from the workload scheduler 146. In some examples, contract terms (such as contract terms included in a contract request provided by the endpoint device 165) are included in the task provided by the endpoint device 165. The edge node 148 may refund and/or request tokens from the workload scheduler 146 based on the contract terms. For example, a contract to in may indicate that if a cost to access energy to execute a workload exceeds four tokens, such as from the energy provider 275, the edge node 148 may execute a first portion of the workload and not a second portion of the workload. The edge node 148 may then refund a count of tokens to the workload scheduler 146, the orchestrator 142, and/or the endpoint device 165, with the count of tokens corresponding to a payment for the edge node 148 to execute the second portion of the workload. The workload scheduler 146 provides the result of the executed workload to the endpoint device 165. (Operation 355). In response to accessing the result of the workload execution, the workload scheduler 146 may provide additional tokens to the edge node 148. In some examples, the workload scheduler 146 returns workload results to a user device, such as the endpoint device 165. In some examples, the orchestrator 142 may return workload results to the endpoint device 165. The workload scheduler 146 may provide the result and/or a receipt of the result to the blockchain node 144. (Operation 337).

Figure 4:
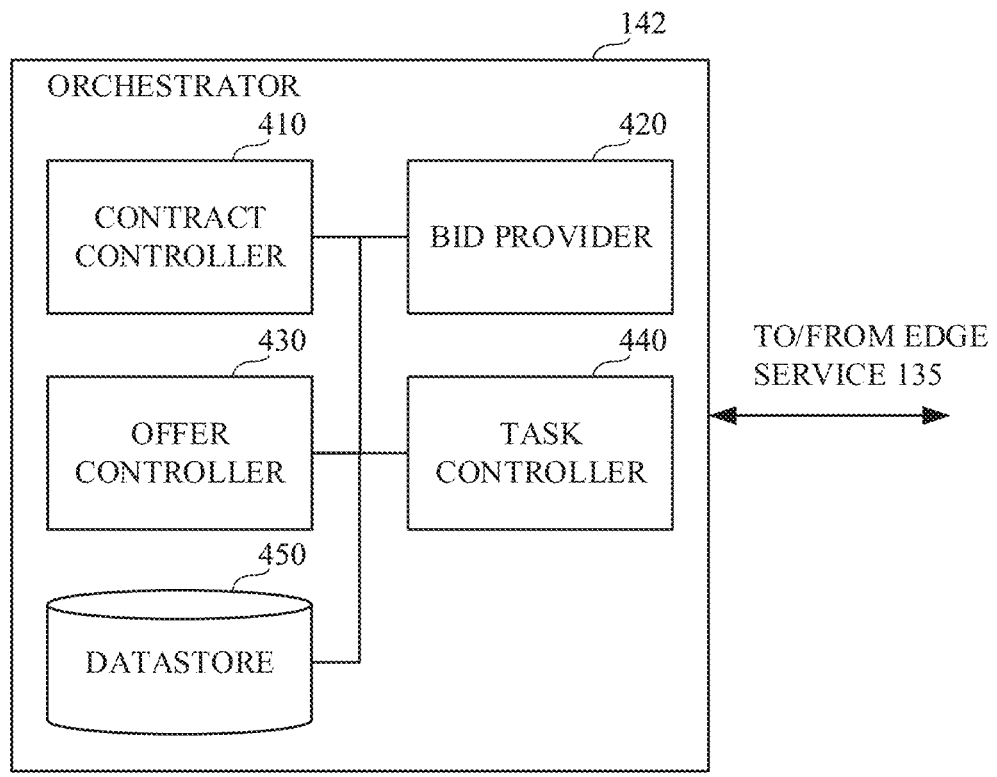
FIG. 4 is a block diagram of an example orchestrator included in the example edge environment of FIG. 1.

FIG. 4 is a block diagram of an example orchestrator 142 included in the example edge environment 110 of FIG. 1. The orchestrator 142 creates a bid based on the request provided by the endpoint device 165 and provides the bid to the edge node 148 (e.g., an EPH node). Further, the orchestrator 142 creates a contract (e.g., an SLA, an e-contract, etc.) based on offers accessed from the edge node 148 and provides the contract to the endpoint device 165. The orchestrator 142 then accesses a task from the endpoint device 165, with the task based on the contract and workload to be executed, and the orchestrator 142 provides the task to the workload scheduler 146. A task may include a contract, a description of a workload, tokens, and/or a count of tokens. The orchestrator 142 includes an example contract controller 410, an example bid provider 420, an example offer controller 430, an example task controller 440, and an example datastore 450.

The contract controller 410 accesses a contract request from the endpoint device 165. The contract request may be associated with a workload to be executed on behalf of the endpoint device 165 (e.g., a user device and/or a device in the environments 105, 110, 112) and may include a description of the workload. Once the orchestrator 142 has accessed an offer from at least one edge node, the contract controller 410 creates a contract based on the at least one offer and provides the contract to the endpoint device 165. In some examples, the contract controller 410 may create multiple contracts based on the at least one offer. In some examples, the contract controller 410 may select a best available offer from the offers provided by the edge nodes 148, 156. The contract controller 410 may determine a best available offer based on terms (e.g., performance terms, resource terms, count of tokens, etc.) included in the offer.

The bid provider 420 generates a bid based on the contract request and provides the bid to a plurality of edge nodes 148, 156. In some examples disclosed herein, the bid includes a workload specification and a count of tokens. As used herein, the phrase "workload specification," and variations thereof, encompass at least one of resource terms, performance terms, or any other suitable terms to be included in a contract for an execution of a workload. Resource terms may include terms regarding the use of system resources (e.g., power metrics) during an execution of the workload. Performance terms may include terms regarding the performance (e.g., performance time and/or performance speed) of the execution of the workload. The tokens (e.g., credits, micro-payment, e-currency, etc.) may be used by the edge node 148 to execute the workload. For example, the edge node 148 may compensate the energy provider 275 with a portion of the tokens to compensate for the energy used to execute the workload. Any other terms, tokens, or other suitable information may be included in a bid created by the orchestrator 142.

In some examples, the bid provider 420 may generate a plurality of bids to be provided to the edge nodes 148, 156. For example, the contract request may include a first description of a first workload to be executed and a second description of a second workload to be executed. The bid provider 420 may generate a first bid based on the first description and a second bid based on the second description and provide the descriptions to the edge nodes 148, 156. In some examples, the orchestrator provides the bid to multiple edge nodes included in the edge service 135 or to other edge services and/or edge nodes included in the edge environment 110.

The offer controller 430 accesses at least one offer from at least one edge node. The offer is responsive to the bid (e.g., provided by the edge node 148 in response to receipt of the bid). In some examples, the offer controller 430 may provide a counteroffer (e.g., a counter bid) to at last one edge node, the counteroffer responsive to an offer. For example, if a bid including a first count of tokens is provided to the edge node 148, and the offer controller 430 accesses an offer from the edge node 148 including a second count of tokens lower than the first count, the offer controller 430 may provide a counteroffer to the edge node 148 including a third count of tokens, the third count lower than the first count and higher than the second count.

The task controller 440 accesses a task from the endpoint device 165 and provides the task to the workload scheduler 146. As mentioned above, a task may include a contract, a description of a workload, tokens, and/or a count of tokens. The task controller 440 provides the task to the workload scheduler 146.

The datastore 450 stores bids to be provided to the edge nodes 148, 156, offers received from the edge nodes 148, 156, and tasks accessed from the endpoint device 165. The example datastore 450 of the illustrated example of FIG. 4 is implemented by any memory, storage device and/or storage disc for storing data such as, for example, flash memory, magnetic media, optical media, solid state memory, hard drive(s), thumb drive(s), etc. Furthermore, the data stored in the example datastore 450 may be in any data format such as, for example, binary data, comma delimited data, tab delimited data, structured query language (SQL) structures, etc. While, in the illustrated example, the example datastore 450 is illustrated as a single device, the example datastore 450 and/or any other data storage devices described herein may be implemented by any number and/or type(s) of memories.

While an example manner of implementing the orchestrator 142 of FIG. 1 is illustrated in FIG. 4, one or more of the elements, processes and/or devices illustrated in FIG. 4 may be combined, divided, re-arranged, omitted, eliminated and/or implemented in any other way. Further, the example contract controller 410, the example bid provider 420, the example offer controller 430, the example task controller 440, the example datastore 450, and/or, more generally, the example orchestrator 142 of FIG. 1 may be implemented by hardware, software, firmware and/or any combination of hardware, software and/or firmware. Thus, for example, any of the example contract controller 410, the example bid provider 420, the example offer controller 430, the example task controller 440, the example datastore 450, and/or, more generally, the example orchestrator 142 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, contract controller 410, the example bid provider 420, the example offer controller 430, the example task controller 440, and/or the example datastore 450 is/are hereby expressly defined to include a non-transitory computer readable storage device or storage disk such as a memory, a digital versatile disk (DVD), a compact disk (CD), a Blu-ray disk, etc. including the software and/or firmware. Further still, the example orchestrator 142 of FIG. 1 may include one or more elements, processes and/or devices in addition to, or instead of, those illustrated in FIG. 4, and/or may include more than one of any or all of the illustrated elements, processes and devices.

Figure 5:
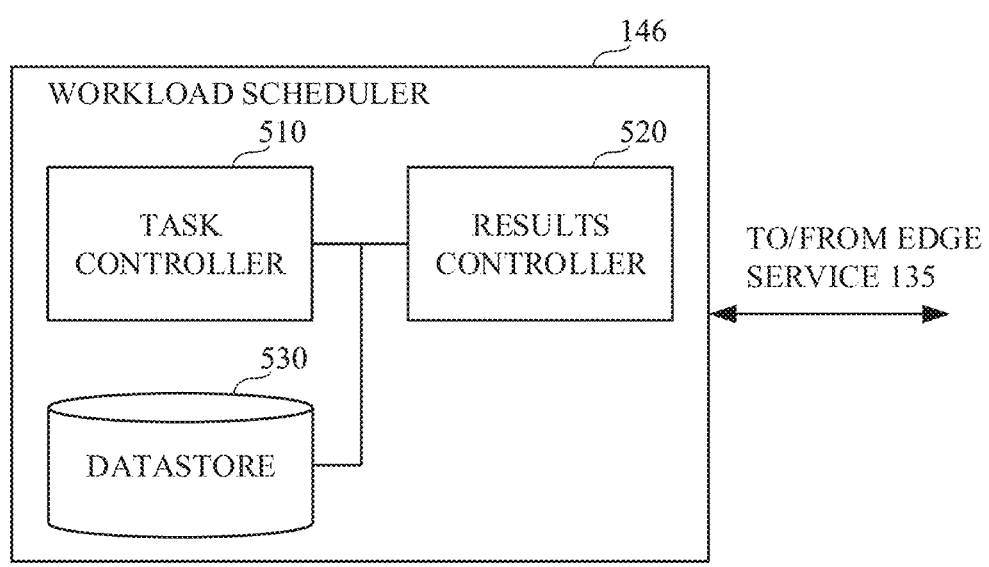
FIG. 5 is a block diagram of an example workload scheduler included in the example edge environment of FIG. 1.

FIG. 5 is a block diagram of an example workload scheduler 146 included in the example edge environment 110 of FIG. 1. The workload scheduler 146 accesses a task from the orchestrator 142 and provides the task to the edge node 148 (e.g., an EPH node). The workload scheduler 146 further accesses a result and/or tokens from the edge node 148 in response to an execution of a workload, and the workload scheduler 146 provides the result to the endpoint device 165. The workload scheduler 146 includes an example task controller 510, an example results controller 520, and an example datastore 530.

The task controller 510 accesses a task from the orchestrator 142. The task controller 510 provides the task to at least one edge node. For example, the task controller 510 provides the task to the edge node 148.

After execution of the workload by the edge node 148, the results controller 520 accesses a result of execution of the workload from the edge node 148. In some examples, the results controller 520 may access multiple results from the edge node 148. The results controller 520 provides the result to the endpoint device 165. In some examples, the result of execution of the workload may include tokens (such as credits, micro-payments, and/or e-currency), and the results controller 520 may retain a portion of the tokens before providing the result to the endpoint device 165. In some examples, the edge node 148 may request additional tokens when providing the result of execution, and the results controller 520 may provide additional tokens to the edge node 148.

The example datastore 530 stores tasks accessed from the orchestrator 142, results based executions of workloads accessed from the edge node 148, and tokens accessed from the edge node 148. The example datastore 530 of the illustrated example of FIG. 5 is implemented by any memory, storage device and/or storage disc for storing data such as, for example, flash memory, magnetic media, optical media, solid state memory, hard drive(s), thumb drive(s), etc. Furthermore, the data stored in the example datastore 530 may be in any data format such as, for example, binary data, comma delimited data, tab delimited data, structured query language (SQL) structures, etc. While, in the illustrated example, the example datastore 530 is illustrated as a single device, the example datastore 530 and/or any other data storage devices described herein may be implemented by any number and/or type(s) of memories.

While an example manner of implementing the workload scheduler 146 of FIG. 1 is illustrated in FIG. 5, one or more of the elements, processes and/or devices illustrated in FIG. 5 may be combined, divided, re-arranged, omitted, eliminated and/or implemented in any other way. Further, the example task controller 510, the example results controller 520, the example datastore 530, and/or, more generally, the example workload scheduler 146 of FIG. 1 may be implemented by hardware, software, firmware and/or any combination of hardware, software and/or firmware. Thus, for example, any of the example task controller 510, the example results controller 520, the example datastore 530, and/or, more generally, the example workload scheduler 146 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example task controller 510, the example results controller 520, and/or the example datastore 530, is/are hereby expressly defined to include a non-transitory computer readable storage device or storage disk such as a memory, a digital versatile disk (DVD), a compact disk (CD), a Blu-ray disk, etc. including the software and/or firmware. Further still, the example workload scheduler 146 of FIG. 1 may include one or more elements, processes and/or devices in addition to, or instead of, those illustrated in FIG. 5, and/or may include more than one of any or all of the illustrated elements, processes and devices.

Figure 6:
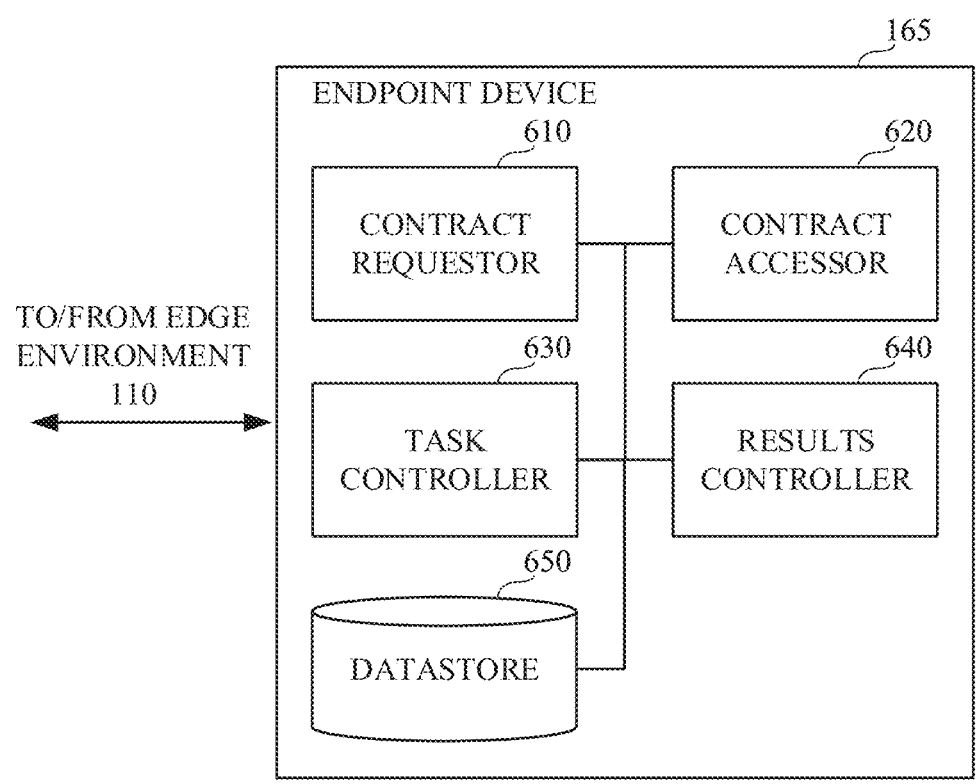
FIG. 6 is a block diagram of an example endpoint device included in the example endpoint environment of FIG. 1.

FIG. 6 is a block diagram of an example endpoint device 165 included in the example endpoint environment 112 of FIG. 1. The endpoint device 165 (e.g., a user device) requests execution of a workload. For example, the endpoint device 165 may request the execution of the workload by providing a contract request (e.g., an SLA request) to the edge service 135 (e.g., the orchestrator 142). The endpoint device 165 accesses a result of the execution of the workload from the workload scheduler 146. The endpoint device 165 includes an example contract requestor 610, an example contract accessor 620, an example task controller 630, an example results controller 640, and an example datastore 650.

The contract requestor 610 requests a contract (e.g., an SLA, an e-contract, etc.) from the orchestrator 142. The contract request may be associated with a task and may include a description of a workload to be executed on behalf of the endpoint device. Further, the contract request provided by the contract requestor 610 may include a description of a workload to be executed, resource terms, and/or performance terms.

The contract accessor 620 accesses a contract from the orchestrator 142. The contract may include resource terms, performance terms, compensation terms (e.g., a count of tokens, credits, and/or micro-payment to be provided by the endpoint device 165), and/or any other suitable terms. In some examples, the contract accessor 620 may determine that a term included in the contract (such as specifications, resource terms, performance terms, or a count of tokens to be provided by the endpoint device 165) is not acceptable, reject the contract provided by the orchestrator 142, and prompt the contract requestor 610 to request a new contract.

The task controller 630 generates a task based on a contract and a description of a workload to be executed and provides the task to the orchestrator 142. The task may include the contract accessed from the orchestrator 142, a description of a workload, a count of tokens to compensate for the execution of the workload (e.g., to be provided to the orchestrator 142, the workload scheduler 146, and/or the edge node 148), etc. In some examples, the task may include tokens rather than a count of tokens to be provided after an execution of a workload.

The results controller 640 then accesses a result of the execution of the workload from the workload scheduler 146. In some examples, the results controller 640 may access multiple results from the workload scheduler 146.

While an example manner of implementing the endpoint device 165 of FIG. 1 is illustrated in FIG. 6, one or more of the elements, processes and/or devices illustrated in FIG. 6 may be combined, divided, re-arranged, omitted, eliminated and/or implemented in any other way. Further, the example contract requestor 610, the example contract accessor 620, the example task controller 630, the example results controller 640, the datastore 650, and/or, more generally, the example endpoint device 165 of FIG. 1 may be implemented by hardware, software, firmware and/or any combination of hardware, software and/or firmware. Thus, for example, any of the example contract requestor 610, the example contract accessor 620, the example task controller 630, the example results controller 640, the example datastore 650, and/or, more generally, the example endpoint device 165 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, contract requestor 610, the example contract accessor 620, the example task controller 630, the example results controller 640, and/or the example datastore 650 is/are hereby expressly defined to include a non-transitory computer readable storage device or storage disk such as a memory, a digital versatile disk (DVD), a compact disk (CD), a Blu-ray disk, etc. including the software and/or firmware. Further still, the example endpoint device 165 of FIG. 1 may include one or more elements, processes and/or devices in addition to, or instead of, those illustrated in FIG. 6, and/or may include more than one of any or all of the illustrated elements, processes and devices.

Figure 7:
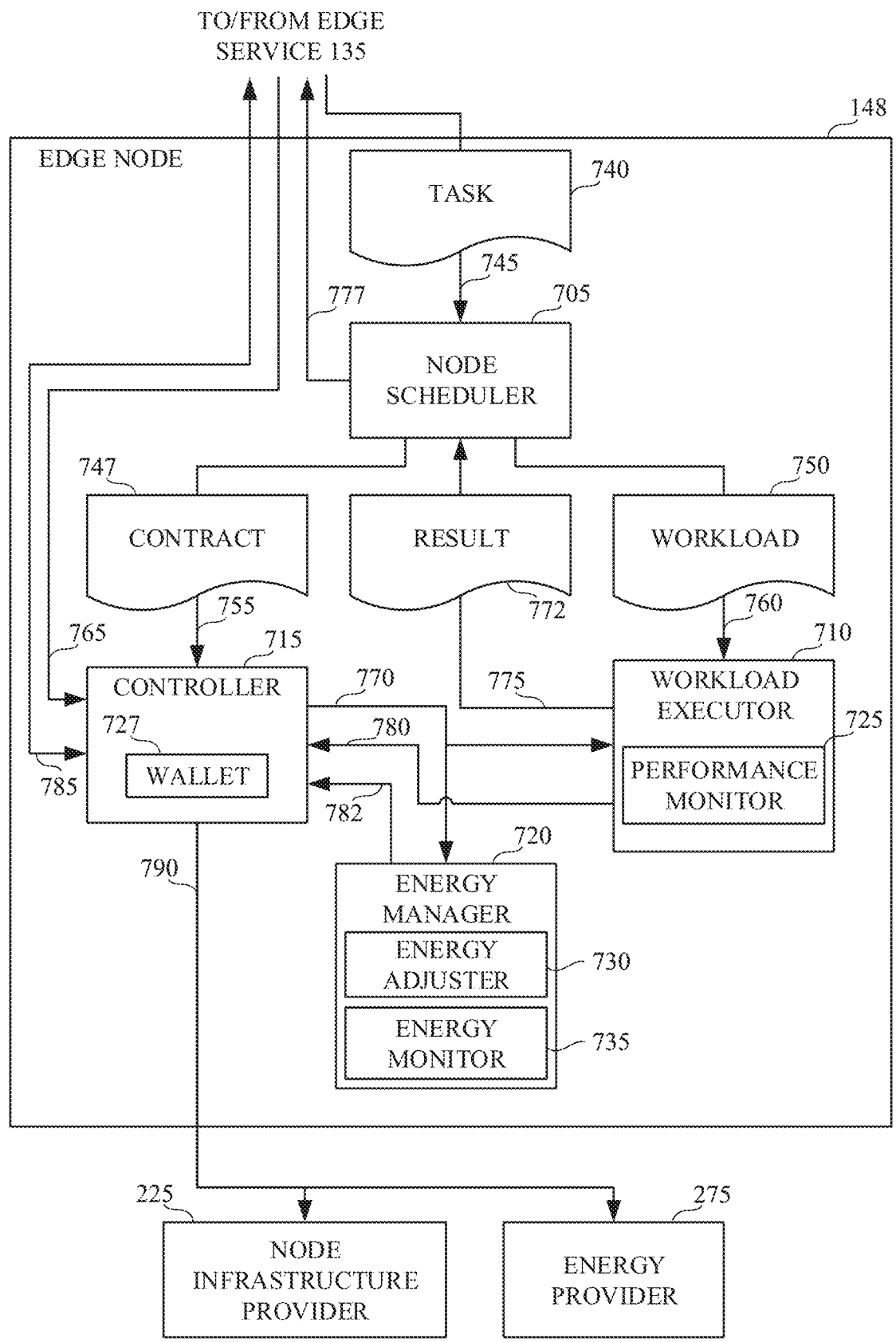
FIG. 7 is a block diagram of an example edge node included in the example edge environment of FIG. 1 and illustrates example operations to execute a workload.

FIG. 7 is a block diagram of an example edge node 148 included in the example edge environment 110 of FIG. 1 and illustrates example operations to execute a workload. The edge node 148 (e.g., an EPH node) includes an example node scheduler 705, an example workload executor 710 (e.g., a CPU), an example controller 715 (e.g., a secure contract logic controller (SCLC)), and an example energy manager 720 (e.g., a Power Management Unit (PMU)). In some examples, the edge node 148 (such as an EPH node) may process a blockchain smart contract that may assist in the discovery, utilization, and settlement of services such as execution of workloads. For an edge model (e.g., a pay-as-you-go model), multiple providers and consumers of resources may be included.

The node scheduler 705 monitors a network (e.g., the edge service 135, the edge environment 110, an EPH, the Internet, etc.) to access edge tasks to execute. The node scheduler 705 accepts tasks from the edge service 135 (e.g., from the workload scheduler 146), provides a contract (e.g., an SLA, an e-contract, etc.) included in a task to the controller 715, and provides a description of a workload to the workload executor 710 such as a central processing unit (CPU). Further, the node scheduler 705 accesses a result of the workload execution from the workload executor 710 and provides the result to the edge service 135 (e.g., the workload scheduler 146).

The workload executor 710 includes an example performance monitor 725. The workload executor 710 accesses a description of a workload from the node scheduler 705 and executes the workload based on the description. For example, a description of a workload may include a machine learning model and a location at which input data resides. The node scheduler 705 may retrieve the input data at the location and execute the machine learning model using the input data. The workload executor 710 provides a result of the workload execution to the node scheduler 705. The performance monitor 725 (e.g., one or more performance counters) monitors performance telemetry (e.g., performance metrics, execution time, energy consumption, throughput, response time, etc.) and provides perform nuance telemetry to the controller 715. The controller 715 may compare the performance metrics to performance terms included in the contract.

The controller 715 evaluates task resources, energy terms, available tokens, the cost of performing the workload based on market rates (e.g., energy costs, infrastructure costs, etc.), etc. The controller 715 (e.g., an SCLC) may monitor and collect telemetry regarding resource utilization and/or energy utilization while a workload executes and/or after workload execution. The controller 715 is connected to the node infrastructure provider 225 (e.g., an EPH provider) and to the energy provider 275. The controller 715 includes an example wallet 727. The controller 715 accesses a contract from the node scheduler 705. The controller 715 accesses tokens (e.g., credits, e-currency, etc.) from the edge service 135 (e.g., the workload scheduler 146) in exchange for edge node services (e.g., executing a workload and providing a result of the execution). The tokens may be stored in the wallet 727, recorded in the blockchain node 144, and/or held in escrow by a third party included in the edge environment 110. A portion of the tokens may be provided to the providers 225, 275 in exchange for providing resources to execute a workload. In some examples, the controller 715 may include a trusted execution environment and/or a trusted platform module to maintain supervisor control over the capabilities of the energy adjuster 730 (such as power scaling, an enabling of power rails to the workload executor 710) and/or prevent circumvention of authorizations by the controller 715 to execute a workload.

In some examples, a CPU uncore may implement and/or include the controller 715 (such as an SCLC) to evaluate the contract and enable power rails to the workload executor 710. The SCLC may also implement elastic power scaling (EPS) logic and/or maintain supervisor control over EPS capabilities (e.g., via an energy adjuster included in the energy manager 720) to avoid EPS circumvention of SCLC authorizations. In some examples, a contract (such as an SLA) may be activated and tracked on a blockchain managed by the blockchain nodes 144, 152. Tokens may be escrowed on the chain and released once there is a proof that the job was completed (e.g., the workload was executed, and a result was provided to the endpoint device 165). In some examples, the controller 715 evaluates task resource requirements, performance requirements, available tokens, and/or the cost of performing the workload based on market rates, such as fluctuating energy costs. The controller 715 may monitor and/or collect telemetry (such as energy telemetry, performance telemetry) regarding resource and power utilization while a given task, function, and/or workload executes.

The controller 715 prompts the workload executor 710 (e.g., a CPU) and the energy manager 720 (e.g., a PMU) to execute the workload. In some examples, the controller 715 may prompt the providers 225, 275 to provide resources to the edge node 148 in order to execute the workload. The controller 715 collects telemetry (e.g., performance metrics and/or energy metrics) from the workload executor 710 and the energy manager 720 to determine whether terms of the contract included in the task were met. In response to determining that contract terms were not met, the controller 715 may provide a portion of the tokens to the edge service 135 or request additional tokens from the edge service 135.

In some examples, the edge node 148 may leverage control surfaces (such as a a power supply unit (PSU), etc.) to prevent an execution of a workload for an identified tenant and/or prevent an execution when a term in an SLA and/or an e-contract may not be met by the execution, when a workload execution has not been authorized by the controller 715, when tokens have not been provided by the workload scheduler 146, etc. For example, a control surface may include a control at the instruction level (such as via one or more no-execute (NX) bits), at the service level (such as via processor affinity), and/or at the execution level (such as via control of a clock controller). An NX bit included in an instruction may indicate that a CPU (e.g., the workload executor 710) is not to execute the instruction. In some examples, one or more NX bits may be used to mark portions of a memory as non-executable. In some examples, NX bits may be used for executable space protection, wherein machine readable instructions stored in a memory are unable to be executed. For example, one or more NX bits may be applied to all of or a portion of a workload stored in a memory to prevent an execution of the workload until token payment details have been stored and/or processed by the wallet 727. The controller 715 may apply and/or remove NX bits (e.g., from an executable representing a workload to be executed) responsive to a task received by the node scheduler 705, payment provided by the workload scheduler 146, etc. to enable and/or disable an execution of the workload by the workload executor 710.

In some examples, the controller 715 may use processor affinity (such as CPU pinning, cache affinity, etc.) to ensure an execution of a workload corresponds to one or more specified execution elements (such as a CPU core, a CPU cache, etc.). For example, the workload executor 710 may include a first CPU core and a second CPU core, and a task may include a contract including a contract term that indicates the workload is to be executed using one CPU core. The contract term specifying a single CPU core may be included to reduce a cost to execute the workload. The controller 715 may use processor affinity to associate the execution of the workload with the first CPU core and not the second. CPU core (e.g., by binding the workload execution process to the first CPU core). The controller 715 may provide control commands to elements included in the workload executor 710 (e.g., a CPU scheduler, a cache controller, etc.) to throttle execution of the workload and/or associate the workload execution with one or more specified CPU cores. In some examples, the workload executor 710 may include a clock controller to vary a clock speed of elements executing a workload, such as a CPU. The controller 715 and/or the energy adjuster 730 may control the clock controller to overclock and/or underclock the workload executor 710 responsive to terms included in a contract, costs to provide energy to the workload executor 710, the number of workloads executed by the workload executor 710, etc. In some examples, control of the clock controller may enable dynamic control of the speed of at least one clock in the workload executor 710.

The energy manager 720 monitors energy (e.g., power) consumption during an execution of a workload and provides energy telemetry (e.g., power metrics) to the controller 715. The energy manager 720 includes an example energy adjuster 730 and an example energy monitor 735. In some examples, the energy manager 720 may be connected to an energy source, such as a power source controller, a power supply unit, an energy provider, a battery, a solar array, a fuel cell, etc. The energy adjuster 730 (e.g., an elastic power scaler) controls available power based on terms included in the task provided by the node scheduler 705. For example, if a description of a workload and/or contract terms indicate that a workload can be executed over a period of time (such as not immediately or across multiple blocks of time), the energy adjuster 730 may lower available resources (such as power consumption, clock rate). The energy adjuster 730 may provide and/or receive instructions from the workload executor 710 to optimize power, performance, and/or cost based on the description of the workload, the contract terms, or a function being executed by the workload executor 710 to execute the workload. In some examples, the energy adjuster 730 controls available power based on workload and/or tenant specific contractual limits. For example, if a workload can be performed across a sufficiently long time window (such as ten minutes, two hours, four days) the energy adjuster 730 may lower available power and/or lower a clock rate (such as the clock rate of the workload executor 710) to use less power and/or energy. The EPS (e.g., implemented by the energy manager 720) may work in conjunction with the CPU (e.g., the workload executor 710) and/or other execution resources to optimize power, performance, and/or cost tradeoffs on a on a per tenant and/or a per function basis.

The energy monitor 735 (e.g., a watt meter) monitors performance metrics and provides energy telemetry to the controller 715. Energy telemetry may include power metrics, energy metrics, resource consumption rates, power usage, and/or other suitable metrics for the controller 715 to access and determine whether terms of a contract were met.

Example operations of the edge node 148 to execute a workload are discussed herein. The node scheduler 705 accesses an example task 740 from the edge service 135 (e.g., the workload scheduler 146). (Operation 745). The task 740 includes an example contract 747 (e.g., an SLA), an example workload 750, and tokens. In some examples, the edge node 148 may accept a workload and an SLA for execution with authorization to use tokens for payment. The node scheduler 705 provides the contract 747 to the controller 715. (Operation 755). In some examples, the SLA (such as the contract 747) is delivered to the SCLC (such as the controller 715) to provide user and/or tenant context for executing the task and/or distributing tokens. The node scheduler 705 provides the workload 750 to the workload executor 710. (Operation 760). In some examples, the node scheduler 705 distributes the workload and/or the task to an execution environment (such as a CPU, the workload executor 710) for execution. The controller 715 accesses tokens to execute the workload from the edge service 135. (Operation 765). In some examples, the controller 715 may access tokens included in the task 740 from the node scheduler 705. In some examples, the controller 715 may access tokens stored in the blockchain node 144, the workload scheduler 146, or the wallet 727. In some examples, the wallet (such as a wallet included in the blockchain node 144) containing tokens to pay for the execution supplies tokens to the SCLC, such as the controller 715. The tokens may be held in escrow until the final results of execution are complete and/or a determination of how appropriately the SLA terms, contract terms, QoS terms, power terms, etc. are met and/or satisfied. The controller sends an instruction to the workload executor 710 and to the energy manager 720 to begin execution of the workload and to begin collecting energy telemetry and performance telemetry. (Operation 770). For example, the SCLC notifies the execution, power, and other relevant system components to commence executing the workload according to QoS requirements, power requirements, etc. The workload executor 710 provides an example result 772 of the execution of the workload to the node scheduler 705. (Operation 775). For example, results of execution are supplied to the local scheduler, such as the node scheduler 705. The node scheduler provides the result 772 to the edge service 135. (Operation 777).

The workload executor 710 (e.g., a CPU) provides performance metrics (e.g., performance telemetry gathered by the performance monitor 725) to the controller 715. (Operation 780). The energy manager 720 (e.g., a PMU) provides energy metrics (e.g., telemetry gathered by the energy monitor 735) to the controller 715. (Operation 782). For example, power and associated telemetry and/or other telemetry (such as performance telemetry, energy telemetry, energy metrics) are collected by the SCLC to determine whether SLA terms are met. The controller 715 determines whether contract terms were met based on the telemetry provided by the workload executor 710 and the energy manager 720. In some examples, the rate of service (such as tokens per watt used) may vary based on the type of workload executed and other SLA agreements. If the controller 715 determines that contract terms were not met, the controller 715 may request additional tokens from the edge service 135 or provide a portion of the tokens included in the task 740 to the edge service 135. (Operation 785). In some examples, the controller 715 and/or the node scheduler 705 may contribute a finalization of the workload to a log and/or a blockchain, such as a blockchain maintained by the blockchain nodes 144, 152. The controller 715 distributes a portion of the tokens included in the task 740 to the node infrastructure provider 225 and/or the energy provider 275. (Operation 790). For example, the wallet included in the SOX accordingly to service and support entities. In some examples, the controller 715 may additionally or alternatively provide tokens to the providers 225, 275 (e.g., operation 790) prior to the execution of the workload by the workload executor 710 and/or prior to finalization of the workload.

While an example manner of implementing the edge node 148 of FIG. 1 is illustrated in FIG. 7, one or more of the elements, processes and/or devices illustrated in FIG. 7 may be combined, divided, re-arranged, omitted, eliminated and/or implemented in any other way. Further, the example node scheduler 705, the example workload executor 710, the example controller 715, the example energy manager 720, and/or, more generally, the example edge node 148 of FIG. 1 may be implemented by hardware, software, firmware and/or any combination of hardware, software and/or firmware. Thus, for example, any of the example node scheduler 705, the example workload executor 710, the example controller 715, the example energy manager 720, and/or, more generally, the example edge node 148 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s))). When reading any of the apparatus or system claims of this patent to cover a purely software and/or firmware implementation, at least one of the example, node scheduler 705, the example workload executor 710, the example controller 715, and/or the example energy manager 720 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge node 148 of FIG. 1 may include one or more elements, processes and/or devices in addition to, or instead of, those illustrated in FIG. 7, and/or may include more than one of any or all of the illustrated elements, processes and devices.

Figure 8:
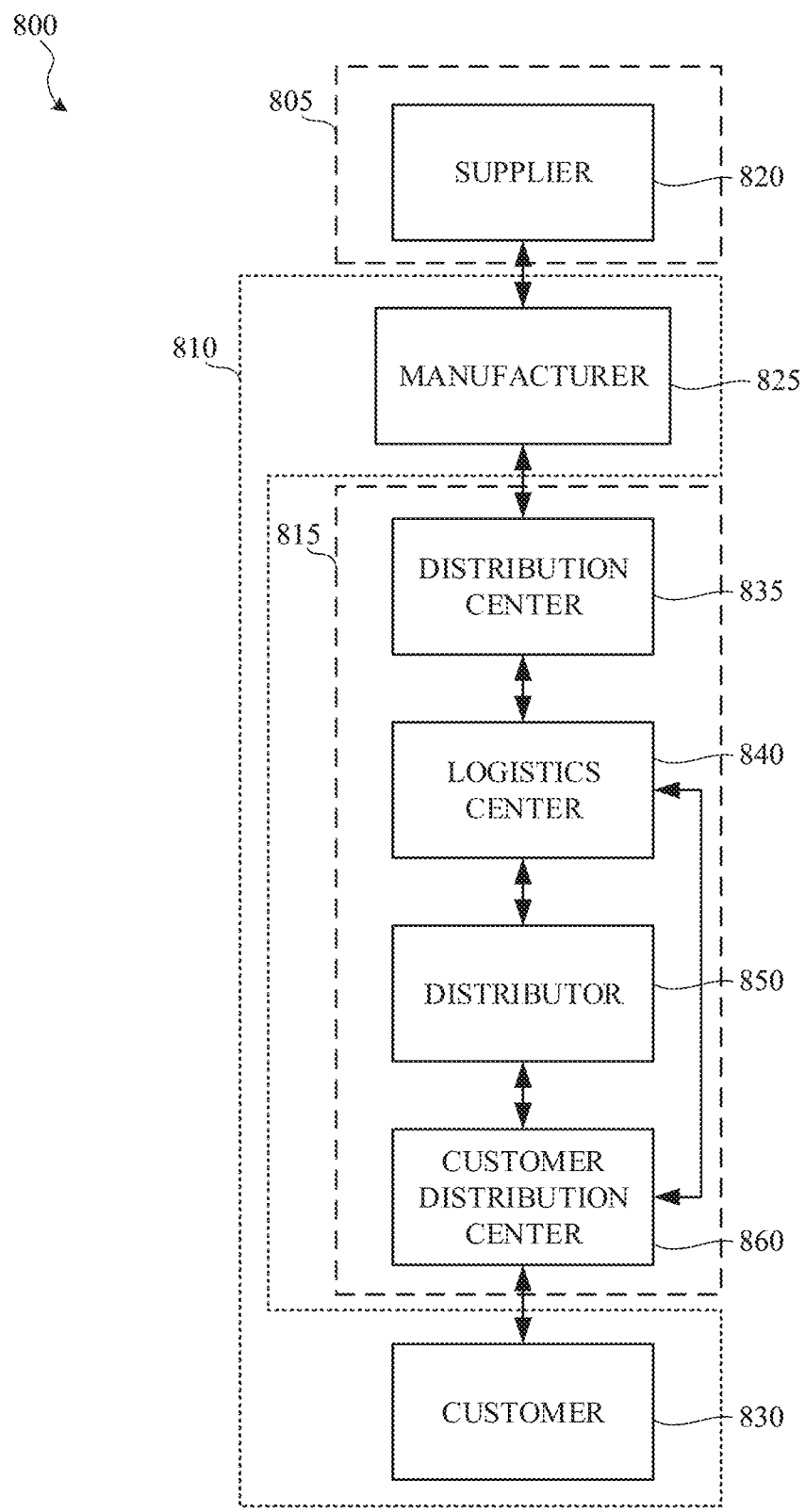
FIG. 8 illustrates an example environment of use including example edge services.

FIG. 8 illustrates an example environment 800 of use including example edge services. The environment 800 of FIG. 8 (e.g., an EaaS network) includes an example supplier scope 805, an example customer scope 810, and an example distribution scope 815. The environment 800 may include automated blockchain tracking of components obtained and/or supplied by stakeholders in the environment 800, and the environment 800 may include an execution of product shipments via contracts (such as e-contracts, smart contracts, SLAs). Contracts and/or tokens used by stakeholders in the environment 800 may be recorded on a blockchain (e.g., the blockchain node 144, a 5G marketplace blockchain), and payments via tokens, credits, and/or micro-payments between stakeholders in the environment 800 may be executed as smart contracts. The supplier scope 805 includes an example supplier 820. In some examples, the supplier scope 805 may include factory component suppliers for one or more products. The example customer scope 810 includes an example manufacturer 825 and an example customer 830. In some examples, the customer scope 810 includes distribution and sales stakeholders for one or more products. The example distribution scope 815 includes an example distribution center 835, an example logistics center 840, an example distributor 850, and an example customer distribution center 860. In the example of FIG. 8, the environment 800 includes a supply chain infrastructure, wherein the supplier scope 805, customer scope 810, and distribution scope 815 supply shipments, products, and/or services in change for payment (such as in the form of a micro-payment, tokens, or e-currency).

The environment 800 may include the edge environment 110 (e.g., an EPH) and/or the endpoint environment 112. For example, the supplier 820 may be included in the endpoint environment 112, and the manufacturer may be included in the edge environment 110. In the example of FIG. 8, the environment 800 is a Fifth Generation (5G) wireless marketplace, wherein each of the stakeholders 820, 825, 830, 835, 840, 850, 860 in the environment 800 are connected via a 5G network. However, the stakeholders may be connected via any other method, such as a Fourth Generation (4G) network, a network such as the Internet, Ethernet, etc. Further, in the example of FIG. 8, each of the stakeholders 820, 825, 830, 835, 840, 850, 860 include both an edge service 135 and an endpoint device 165. In other words, each of the stakeholders 820, 825, 830, 835, 840, 850, 860 may request a workload to be executed by another stakeholder, execute a workload on behalf of another stakeholder, and/or provide the result of the workload execution to another stakeholder.

The supplier 820 receives an order from another stakeholder, confirms the order has been received, and ships components requested in the order to another stakeholder (e.g., the manufacturer 825, the customer 830, etc.). The supplier 820 may request a workload to be executed by another stakeholder, such as executing instructions on a large dataset of component inventory records. In some examples, the supplier 820 receives product orders, confirms receipt of product orders, manages inventory of components, and/or ships components to other stakeholders.

The manufacturer 825 builds base assemblies using components obtained from the supplier 820 and creates shipment orders to deliver the base assemblies to other stakeholders, such as the distribution center 835 or the customer 830. The manufacturer 825 may request a workload to be executed by another stakeholder, such as a workload to create, record, and store details for shipments delivered by the manufacturer 825. In some examples, the manufacturer 825 may manage inventory of components. In some examples, the customer scope may include sources and/or customers for the manufacturer 825, such as a manufacturer in-source and/or a manufacturer out-source.

The distribution center 835 obtains assemblies from the manufacturer 825 and packages the assemblies into large orders to be supplied to other stakeholders, such as the logistics center 840. The distribution center 835 may request a workload to be executed by another stakeholder, such as a workload to determine a sorting method to sort and package assemblies. In some examples, the distribution center 835 configures assemblies based on parts received from other stakeholders (such as the manufacturer 825) and/or manages inventory of assemblies and/or packages (such as finished goods).

The logistics center 840 (e.g., a third-party logistics (3PL) center) obtains assemblies from the manufacturer 825 and/or packages from the distribution center 835 and forwards the assemblies and/or packages to other stakeholders, such as the distributor 850. The logistics center 840 may ensure that items obtained from other stakeholders (e.g., the assemblies, the packages, etc.) are maintaining a delivery course. The logistics center 840 may request a workload to be executed by another stakeholder, such as a workload to determine whether a number of packages are maintaining corresponding delivery courses. In some examples, the logistics center 840 forwards freight to other stakeholders (such as the distributor 850), ensures that items obtained from other stakeholders have cleared a nation's customs administration, consolidates assemblies and/or packages into shipments to deliver to other stakeholders, and/or manages an inventory of shipments obtained by and/or provided to other stakeholders in the environment 800 (such as finished goods). In some examples, the logistics center 840 may directly ship inventory to the customer distribution center 860.

The distributor 850 obtains shipments from other stakeholders (such as the logistics center 840) and distributes items from the shipments to stakeholders such as the customer 830. The distributor 850 may request a workload to be executed by another stakeholder, such as a workload to identify a plurality of stakeholders to which the distributor 850 will deliver shipments. In some examples, the distributor 850 may break shipments (such as bulk) from other stakeholders into smaller shipments, unload materials from a received shipment into an outbound shipment (such as cross-docking), manage an inventory of shipments (such as finished goods), and/or generate finished products (such as kits) from shipments obtained from other stakeholders.

The customer distribution center 860 tracks forecasts and predictions of future orders from customers (e.g., the customer 830). The customer distribution center 860 may maintain an inventory of obtained items, such as received shipments or goods returned by the customer 830. The customer distribution center 860 may also dispatch shipments to retailers in the edge environment 110 and/or the customer 830. The customer distribution center 860 may request a workload to be executed by another stakeholder, such as a workload to generate a shipment schedule corresponding to a plurality of goods and a plurality of retailers. In some examples, the customer distribution center 860 may generate and retain receipt of goods obtained from other stakeholders.

The customer 830 may be a point of sale, such as a retail service. The customer 830 may purchase products or shipments from other stakeholders, maintain an inventory, and/or return products to the other stakeholders. The customer 830 may request a workload to be executed by another stakeholder, such as a workload to manage inventory of finished goods obtained from stakeholders and/or sold to customers. In some examples, the customer 830 may manage a point of sale system, sell-through inventory, customer returns, and/or product post sales.

Figure 9:
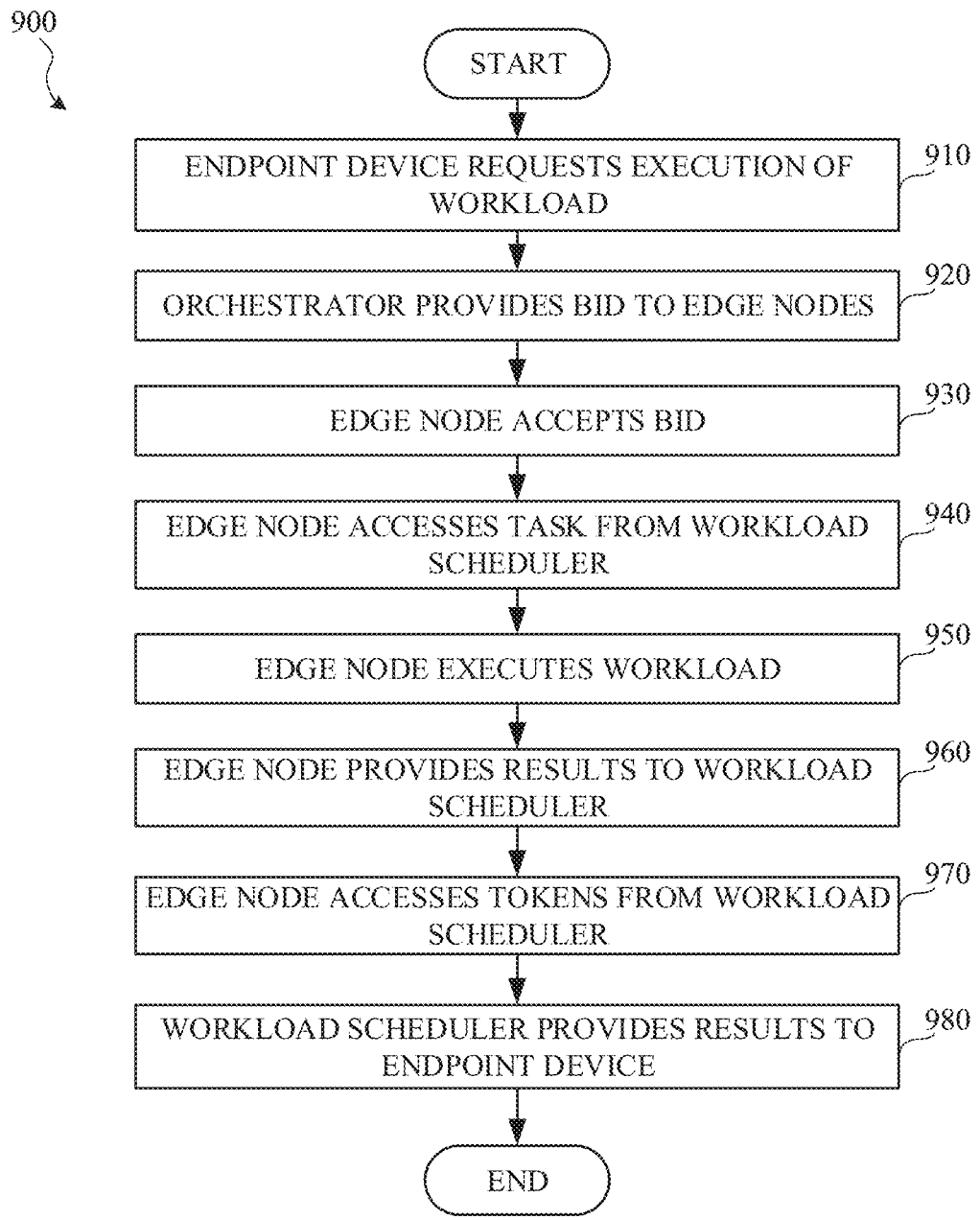
FIG. 9 is a flowchart representative of machine readable instructions which may be executed to implement the example edge service and/or the example endpoint device of FIGS. 1, 2, 3, 4, 5, 6, and/or 7.
Figure 13:
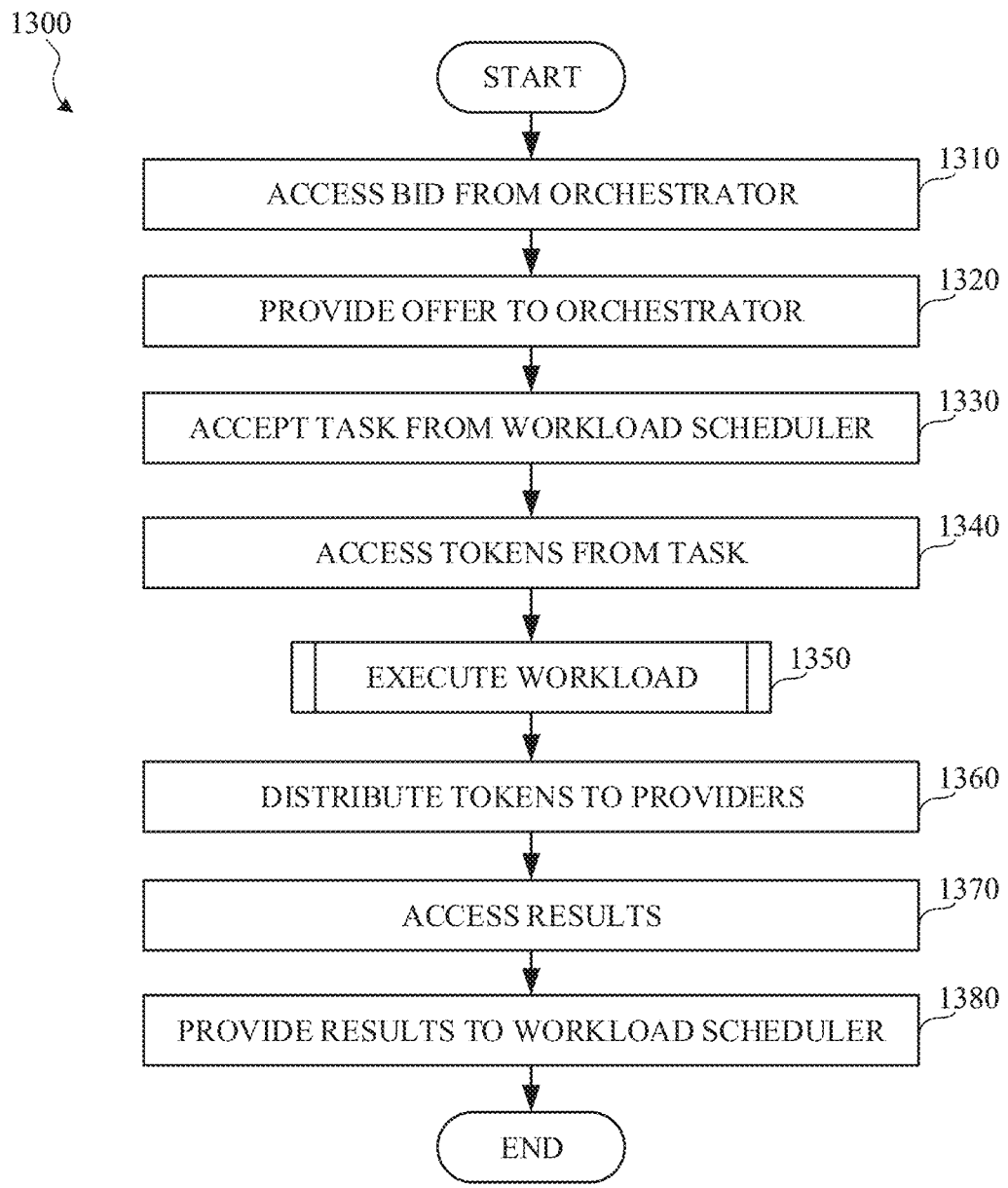
FIG. 13 is a flowchart representative of machine readable instructions which may be executed to implement the example edge node of FIGS. 1, 2, 3, and/or 7.
Figure 14:
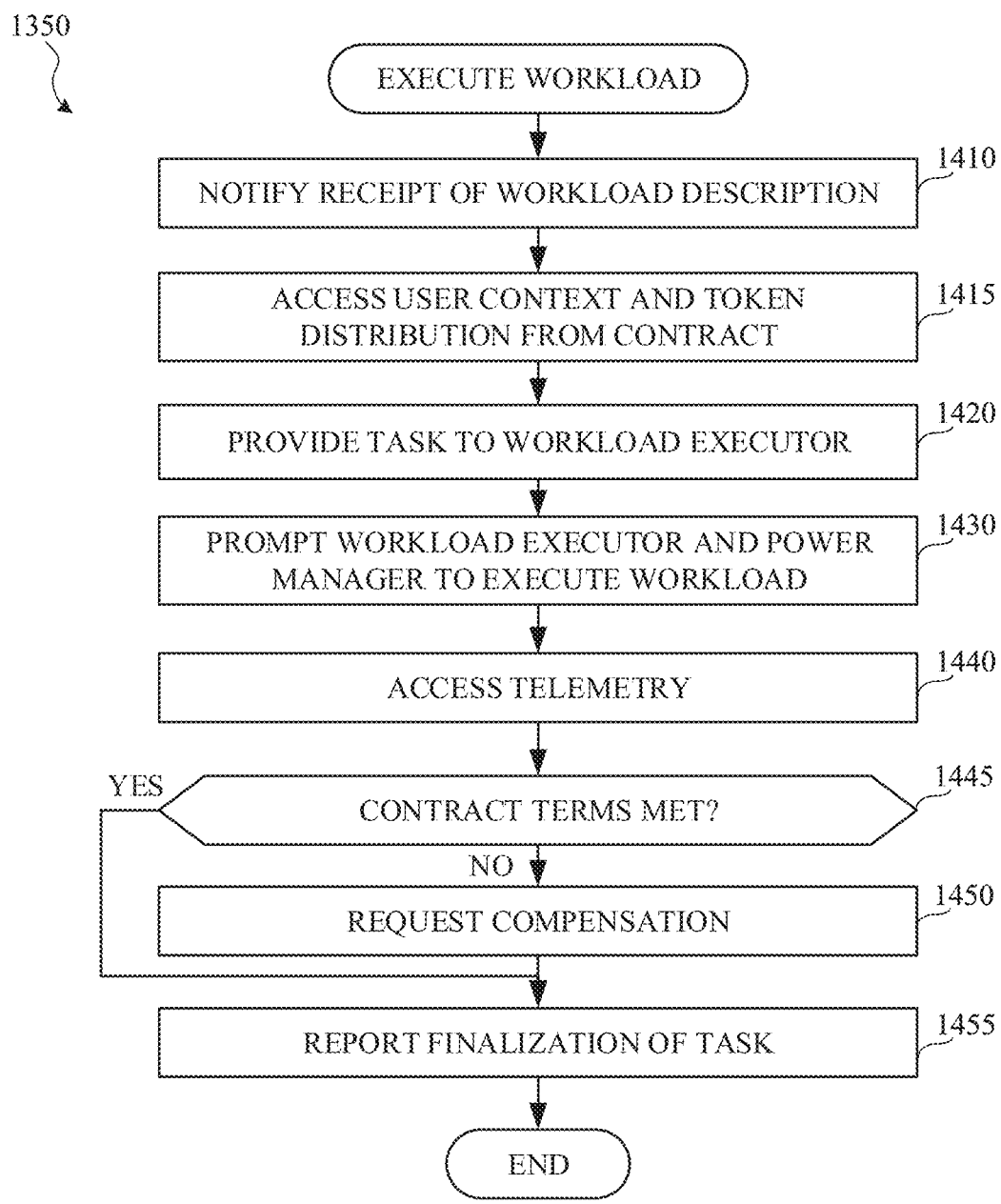
FIG. 14 is a flowchart representative of the machine readable instructions of FIG. 13 which may be executed to implement the example edge node of FIGS. 1, 2, 3, and/or 7 to execute a workload.

Flowcharts representative of example hardware logic, machine readable instructions, hardware implemented state machines, and/or any combination thereof for implementing the edge node 148 of FIG. 1 are shown in FIGS. 9, 13, and 14. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 9, 13, and/or 14, many other methods of implementing the example edge node 148 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 10:
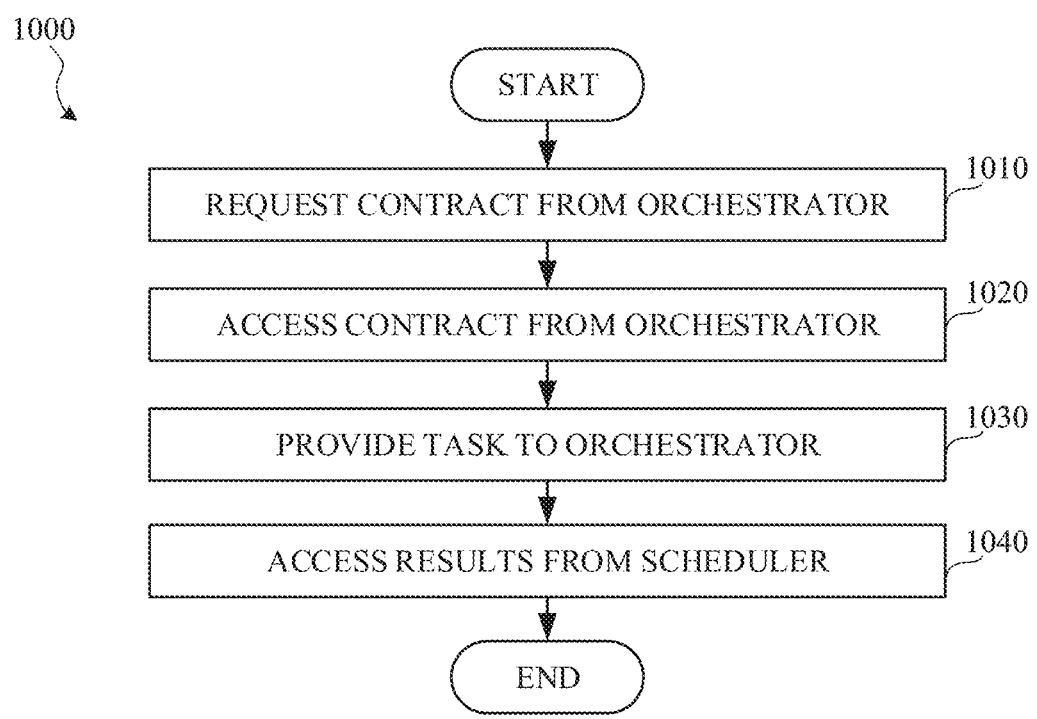
FIG. 10 is a flowchart representative of machine readable instructions which may be executed to implement the example endpoint device of FIGS. 1, 2, 3, and/or 6.

Flowcharts representative of example hardware logic, machine readable instructions, hardware implemented state machines, and/or any combination thereof for implementing the endpoint device 165 of FIG. 1 is shown in FIGS. 9 and 10. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 9 and/or 10, many other methods of implementing the example endpoint device 165 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 11:
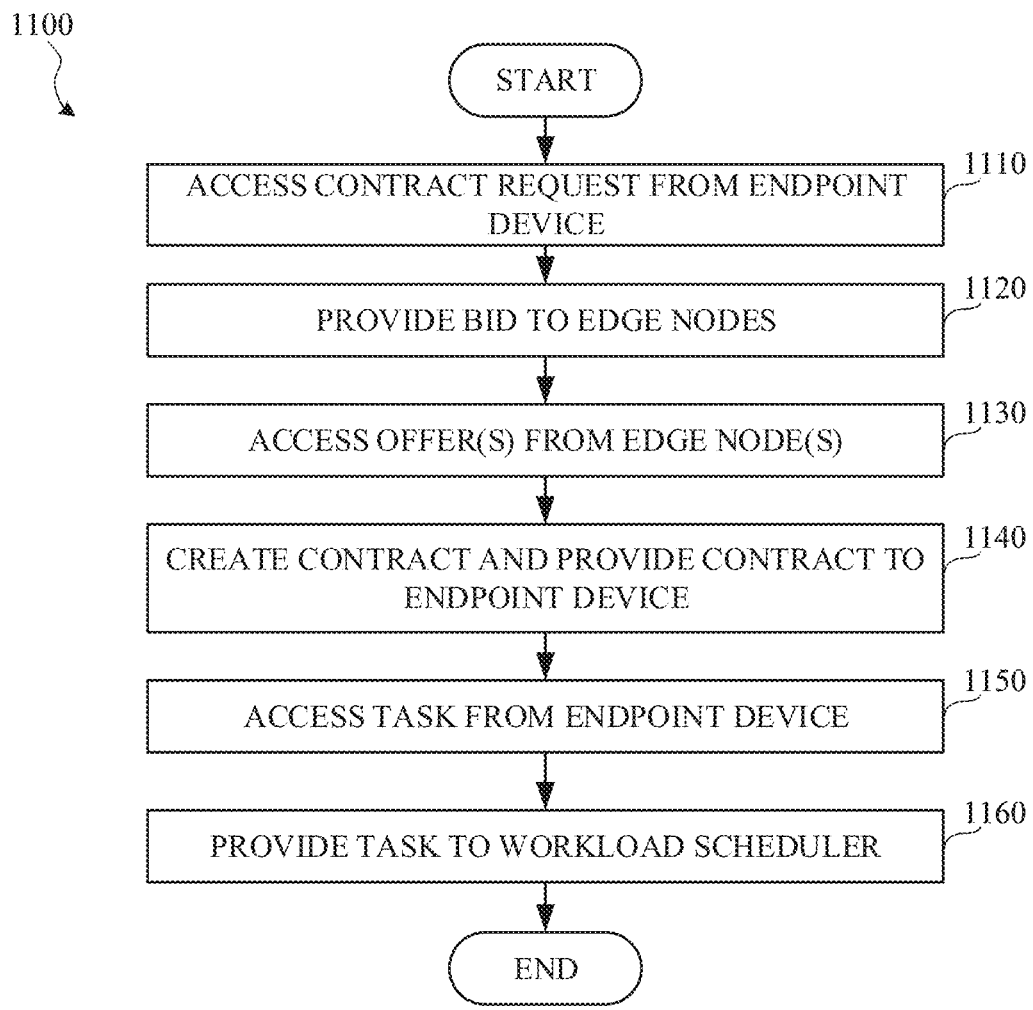
FIG. 11 is a flowchart representative of machine readable instructions which may be executed to implement the example orchestrator of FIGS. 1, 2, 3, and/or 4.

Flowcharts representative of example hardware logic, machine readable instructions, hardware implemented state machines, and/or any combination thereof for implementing the orchestrator 142 of FIG. 1 are shown in FIGS. 9 and 11. The machine readable instructions may be one or more executable programs or portion(s) of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 9 and/or 11, many other methods of implementing the example orchestrator 142 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 12:
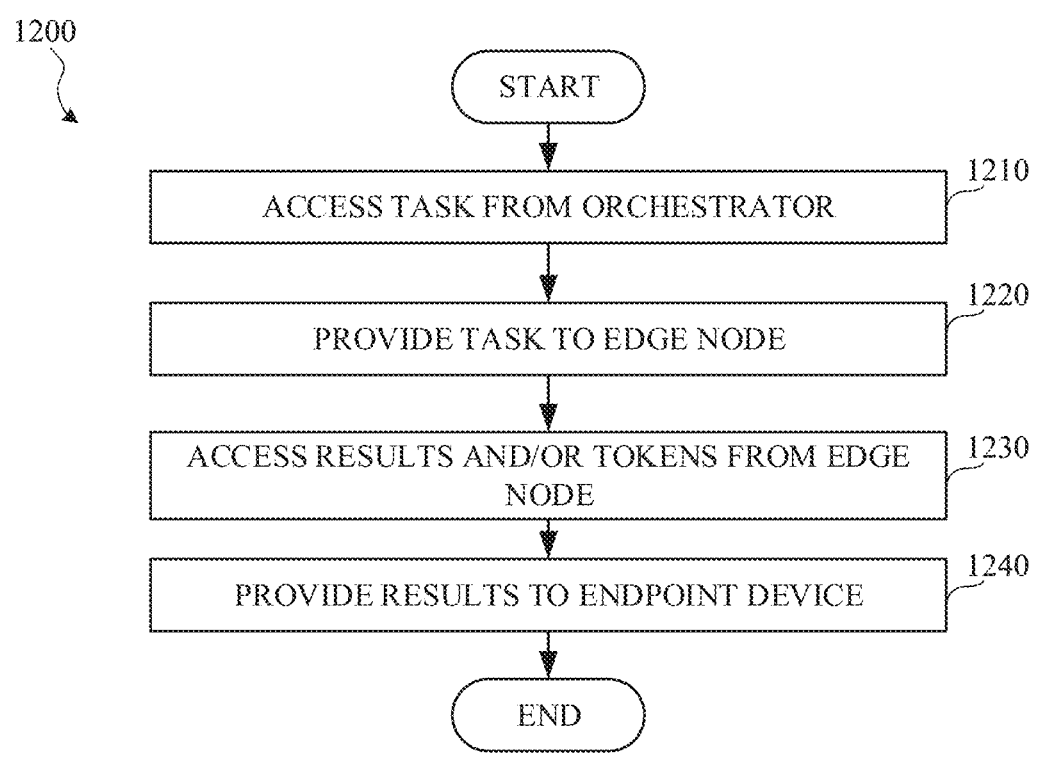
FIG. 12 is a flowchart representative of machine readable instructions which may be executed to implement the example workload scheduler of FIGS. 1, 2, 3, and/or 5.

Flowcharts representative of example hardware logic, machine readable instructions, hardware implemented state machines, and/or any combination thereof for implementing the workload scheduler 146 of FIG. 1 is shown in FIGS. 9 and 12. The machine readable instructions may be one or more executable programs or portion(s) of an executable program for execution by a computer processor such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 9 and/or 12, many other methods of implementing the example workload scheduler 146 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 9 is a flowchart representative of machine readable instructions 900 which may be executed to implement the example edge service 135 and/or the example endpoint device 165 of FIGS. 1, 2, 3, 4, 5, 6, and/or 7. The endpoint device 165 (e.g., a user device) requests execution of a workload. (Block 910). In examples disclosed herein, the endpoint device 165 requests execution of a workload by providing a contract request (e.g., a request for an SLA) to the edge service 135 (such as the orchestrator 142). As mentioned above, a contract request may include a description of a workload. For example, the contract request may include a data structure indicating the type of workload to be executed, a workload in the form of an executable structure, input data to be analyzed by a machine learning model, etc. A contract request may include multiple descriptions associated with workload(s) to be executed. For example, the endpoint device 165 may provide a contract request including a first description of a first workload to be executed and a second description of a second workload to be executed. In another example, the endpoint device 165 may provide a contract request including a first description of a workload to be executed and a second description of the workload, wherein the execution of the workload is separated into a first execution (e.g., an execution based on the first description) and a second execution (e.g., an execution based on the second description). In some examples, the endpoint device 165 may provide the contract request to the blockchain node 144.

The orchestrator 142 creates a bid based on the request provided by the endpoint device 165, and the orchestrator 142 provides the bid to the edge node 148, such as an EPH node. (Block 920). As mentioned above, a bid may include a workload specification (e.g., performance terms, resource terms, etc.), tokens (e.g., a micro-payment, an e-currency, etc.), and/or a count of tokens. In some examples, the orchestrator 142 provides the bid to multiple edge nodes included in the edge service 135 and/or to other edge services and/or edge nodes included in the edge environment 110. In some examples, the orchestrator 142 generates multiple bids based on the contract request and provides the bids to a plurality of edge nodes.

The edge node 148 accesses the bid and determines whether to accept, modify, or reject the bid. In the example of FIG. 9, the edge node 148 accepts the hid. (Block 930). In response to accepting the bid, the edge node 148 provides an offer to the orchestrator 142, the offer based on the bid. For example, the offer may include modified resource terms, modified performance terms, and/or a modified count of tokens. In some examples, the edge node 148 may reject the bid.

The orchestrator 142 generates a contract based on the offer provided by the edge node 148. The endpoint device 165 creates a task based on the contract. In examples disclosed herein, a task includes a contract indicating the terms and/or agreements of the execution of the workload and the compensation method. The task may include a description of the workload to be executed, tokens, and/or a count of tokens. However, any other suitable information regarding the execution of the workload may additionally and/or alternatively be included. The edge node 148 accesses the task from the workload scheduler 146. (Block 940). The edge node 148 executes the workload based on the description of the workload. (Block 950).

The edge node 148 accesses a result of the execution of the workload and provides the result to the workload scheduler 146. (Block 960). Multiple results of the execution of the workload may be accessed by the edge node 148. For example, the workload description may indicate that a first input and a second input are to be analyzed by a machine learning model, and the edge node 148 may access a result of the machine learning model for the first input and a result of the machine learning model for the second input. In some examples, the result accessed by the edge node 148 may include performance results (e.g., a performance time of the execution of the workload) or resource results (e.g., the power and/or energy used by the edge node 148 to execute the workload).

The edge node 148 accesses tokens from the workload scheduler 146. (Block 970). The tokens compensate the edge node 148 for the execution of the workload (e.g., for a result provided by the edge node 148 in response to the execution of the workload). In some examples, the edge node 148 may request a count of tokens to be provided by the workload scheduler 146 that is different from a count of tokens indicated in the task. For example, the edge node 148 may determine that additional energy was used to execute the workload than resources indicated in terms of the contract, and the edge node 148 may request tokens from the workload scheduler 146 in addition to the token count included in the contract. In another example, the edge node 148 may determine that a performance period to execute the workload (e.g., a time to execute the workload) is shorter than the performance period stated in terms of the contract, and the edge node 148 may request fewer tokens from the workload scheduler 146 compared to the token count included in the contract. The edge node 148 may access tokens from the workload scheduler 146 (such as block 970) prior to accessing a task from the workload scheduler 146 (such as block 940). For example, the edge node 148 may obtain first tokens from the workload scheduler 146, provide the first tokens to the energy provider 275 to enable execution of the workload, execute the workload using resources provided by the energy provider 275, provide a result of the workload execution to the workload scheduler 146, and access second tokens from the workload scheduler 146.

The workload scheduler 146 provides the result of the execution of the workload to the endpoint device 165. (Block 980). In some examples, the workload scheduler 146 may provide multiple results to the endpoint device 165. In some examples, the workload scheduler 146 may provide additional and/or alternative results, such as performance results or resource results, to the endpoint device 165.

FIG. 10 is a flowchart representative of machine readable instructions 1000 which may be executed to implement the example endpoint device 165 of FIGS. 1, 2, 3, and/or 6. The contract requestor 610 requests a contract (e.g., an SLA, an e-contract, etc.) from the orchestrator 142. (Block 1010). In examples disclosed herein, the contract requestor 610 requests a contract by providing a contract request to the orchestrator 142. The contract request may be associated with a workload to be executed on behalf of the endpoint device 165 (e.g., a user device). Further, the contract request provided by the contract requestor 610 may include a description of the workload to be executed, resource terms, and/or performance terms. The contract accessor 620 accesses a contract from the orchestrator 142. (Block 1020). The contract may include resource terms, performance terms, compensation terms (e.g., a count of tokens to be provided by the endpoint device 165), and/or any other suitable terms.

The task controller 630 generates a task based on the contract and a description of a workload to be executed, and the task controller 630 provides the task to the orchestrator 142. (Block 1030). The task may include the contract accessed from the orchestrator 142, a description of a workload, and a count of tokens to compensate for the execution of the workload (e.g., to be provided to the orchestrator 142, the workload scheduler 146, and/or the edge node 148). In some examples, the task may include tokens (e.g., a micro-payment, e-currency, credits, etc.) rather than a count of tokens to be provided after an execution of a workload. The results controller 640 accesses a result of the execution of the workload from the workload scheduler 146. (Block 1040).

FIG. 11 is a flowchart representative of machine readable instructions 1100 which may be executed to implement the example orchestrator 142 of FIGS. 1, 2, 3, and/or 4. The contract controller 410 accesses a contract request from the endpoint device 165. (Block 1110). The contract request may include a description of a workload to be executed on behalf of the endpoint device 165. The bid provider 420 generates a bid based on the contract request and provides the bid to a plurality of edge nodes (e.g., EPH nodes). (Block 1120). In some examples, the bid provider 420 may generate multiple bids to be provided to the edge nodes 148, 156. For example, the contract request may include a first description of a first workload to be executed and a second description of a second workload to be executed. The bid provider 420 may generate a first bid based on the first description and a second bid based on the second description, the descriptions to be provided to the edge nodes 148, 156. In another example, the bid provider may generate a first bid and a second bid, wherein both the first bid and the second bid are based on one description of a workload.

The offer controller 430 accesses at least one offer from at least one edge node. (Block 1130). The offer is responsive to the bid (e.g., provided by the edge node 148 in response to receipt of the bid). In some examples, the offer controller 430 may provide a counteroffer (such as a counter bid) to at least one edge node, the counteroffer responsive to an offer. The contract controller 410 creates a contract based on the at least one offer and provides the contract to the endpoint device 165. (Block 1140). In some examples, an offer and/or a bid may include an authorization to provide tokens, such as a micro-payment and/or e-currency, for an unlimited utilization of compute resources (such as energy, processors, and/or storage) used by the edge node 148 to execute a workload. For example, a contract may include an unlimited count of tokens and a time period over which the edge node 148 may execute a workload. The endpoint device 165 (e.g., a user device) may reimburse tokens to the edge node 148 based on resources used by the edge node 148 to execute the workload during the time period. In another example, a contract may include an unlimited count of tokens, and the endpoint device 165 may reimburse any number of tokens to the edge node 148 based on resources used by the edge node 148 to execute the workload.

In some examples, a contract (such as an SLA, an e-contract) may include a subscription to resources maintained by the edge node 148. For example, a contract may include a time period (such as a subscription time period) and a count of tokens. The endpoint device 165 may reimburse the edge node 148 the count of tokens, and the edge node 148 may execute an unlimited number of workloads and/or use an unlimited amount of resources to execute the workload(s) within the subscription time period. In some examples, the contract controller 410 may create multiple contracts based on the at least one offer. For example, the contract controller 410 may create a first contract based on a first offer from a first edge node and a second contract based on a second offer from a second edge node. In some examples, the contract controller 410 may select a best available offer from the offers provided by the edge nodes 148, 156. The contract controller 410 may determine a best available offer based on terms (e.g., performance terms, resource terms, count of tokens, etc.) included in the offer.

In some examples, the contract controller 410 may create one or more contracts based on contract terms included in the contract request and/or the at least one offer. For example, a contract request may include a first description of a first workload and a second description of a second workload to be executed. The offer provided by the edge node 148 may include a first count of tokens that exceeds a term included in the contract request (e.g., the edge node 148 offers to be reimbursed five tokens in exchange for executing the first workload and the second workload). In response to the offer exceeding the term, the contract controller 410 may create a first counteroffer for the edge node 148 to execute the first workload for a second count of tokens lower than the first count of tokens and a second counteroffer for a second edge node to execute the second workload for a third count of tokens lower than the first count of tokens. The contract controller 410 then may create a first contract based on the first counteroffer accepted by the edge node 148 and a second contract based on the second counteroffer accepted by the second edge node.

The task controller 440 accesses a task from the endpoint device 165 and provides the task to at least one edge node. (Block 1150). As mentioned above, the task may include a contract, a description of a workload, tokens, and/or a count of tokens. The task controller 440 provides the task to the workload scheduler 146. (Block 1160).

FIG. 12 is a flowchart representative of machine readable instructions 1200 which may be executed to implement the example workload scheduler 146 of FIGS. 1, 2, 3, and/or 5. The task controller 510 accesses a task from the orchestrator 142. (Block 1210). The task controller 510 provides the task to at least one edge node (e.g., the edge node 148, an EPH node, etc.). The task controller 510 provides the task to at least one edge node. (Block 1220). After an execution of the workload by the edge node 148, the results controller 520 accesses a result of execution of the workload from the edge node 148. (Block 1230). In some examples, the results controller 520 may access multiple results from the edge node 148. The results controller 520 provides the result to the endpoint device 165. (Block 1240). In some examples, the result of execution of the workload may include tokens, and the results controller 520 may retain a portion of the tokens before providing the result to the endpoint device 165. In some examples, the edge node 148 may determine that terms of the contract were not met during the execution of the workload. If the edge node 148 determines that teens of the contract were not met, the results controller 520 may access tokens from the edge node 148, or the results controller 520 may provide additional tokens to the edge node 148.

FIG. 13 is a flowchart representative of machine readable instructions 1300 which may be executed to implement the example edge node 148 of FIGS. 1, 2, 3, and/or 7. The node scheduler 705 accesses a bid from the orchestrator 142. (Block 1310). A bid may include a workload specification and a count of tokens (e.g., an amount of a micro-payment, a count of credits, an amount of e-currency, etc.). The node scheduler 705 generates an offer based on the bid and provides the offer to the orchestrator 142. (Block 1320). In some examples, the node scheduler 705 may provide multiple offers to the orchestrator 142. In some examples, the node scheduler 705 may provide the offer to the workload scheduler 146 or to the blockchain node 144. In the example of FIG. 13, the offer includes a workload specification and a count of tokens. The workload specification and/or the count of tokens may be different from that of the bid. For example, the workload specification may include a performance term that includes a target execution time greater than that of a second target execution time included in the workload specification of the bid, or the count of tokens included in the bid may be lower than that of the count of tokens included in the offer.

The node scheduler 705 accepts a task from the workload scheduler 146. (Block 1330). As mentioned above, a task may include a description of a workload, a contract (such as an SLA), and tokens. The edge node 148 (e.g., an EPH node) accesses tokens included in the task. (Block 1340). In some examples, the node scheduler 705 and/or the controller 715 (such as an SCLC) may access the tokens included in the task to provide payment to providers (e.g., the node infrastructure provider 225, an EPH provider, the energy provider 275, etc.) and/or the workload executor 710 (e.g., a CPU) to execute the workload. For example, the controller 715 may provide a portion of the tokens to the energy provider 275 to pay for energy (such as power) used to execute the workload. In another example, the node scheduler 705 may provide a portion of the tokens to the workload executor 710 to pay for resources used by the workload executor 710 to execute the workload. The controller 715 may store the tokens in the wallet 727. In some examples, the tokens are held in escrow until the workload is executed and/or the contract terms have been met as determined by the controller 715, as discussed below in connection with FIG. 14. In some examples, the distribution or accessing of tokens may be stored as records in the blockchain node 144.

The workload executor 710 executes the workload. (Block 1350). Further details regarding the execution of the workload by the workload executor 710 is discussed below in connection with FIG. 14. The controller 715 distributes at least one of the tokens to at least one provider (e.g., the node infrastructure provider 225, the energy provider 275, etc.). (Block 1360). In some examples, the controller 715 may access tokens additional and/or alternative to tokens included in the task to provide to the providers. For example, in response to an execution of a workload, the controller 715 may request additional tokens from the workload scheduler 146, or the controller 715 may provide a portion of the additional tokens to the energy provider 275.

The node scheduler 705 accesses a result of the executed workload from the workload executor 710. (Block 1370). In some examples, the node scheduler 705 accesses multiple results of the executed workload. In some examples, the result accessed by the edge node 148 may include performance results (e.g., a performance time of the execution of the workload) and/or resource results (e.g., the power and/or energy used by the edge node 148 to execute the workload). The node scheduler 705 provides the result of the execution of the workload to the workload scheduler 146 included in the edge environment 110. (Block 1380). In some examples, the node scheduler 705 may provide the result of the execution of the workload to the orchestrator 142, the endpoint device 165, and/or the server 115 in the cloud environment 105. In some examples, the node scheduler 705 may provide the result and/or a receipt of the result to the blockchain node 144.

FIG. 14 is a flowchart representative of the machine readable instructions 1350 of FIG. 13 which may be executed to implement the example edge node 148 of FIGS.

1, 2, 3, and/or 7 to execute a workload. The node scheduler 705 notifies a receipt of a workload description to the edge service (e.g., the blockchain node 144). (Block 1410). In some examples, the node scheduler 705 may provide the task and/or receipt of the task to a centralized server, such as the server 115 in the cloud environment 105. In some examples, the node scheduler 705 may notify receipt of a workload description to the orchestrator 142, the workload scheduler 146, and/or the endpoint device 165.

The controller 715 (e.g., an SCLC) accesses a user context and token distribution information from a contract. (Block 1415). In the example illustrated in FIG. 14, the contract is included in a task. In some examples, the contract may include an SLA and/or an e-contract. The user context may include information associated with the endpoint device 165 that requested the workload execution and/or information associated with the orchestrator 142 or the workload scheduler 146. For example, the user context may include an identifier associated with the endpoint device 165 (e.g., a user device). In some examples, the user context may include information to identify the workload scheduler 146 that provided the task to the edge node 148. The user context may include information associated with the execution of the workload. For example, the user context may include a description or a partial description of a workload to be executed.

The token distribution information includes information regarding the distribution of tokens (e.g., credits, micropayment, e-currency, etc.) to the orchestrator 142, the workload scheduler 146, the edge node 148, and/or the providers 225, 275. For example, the token distribution information may include instructions to distribute a token to the node infrastructure provider 225, such as an EPH provider, and two tokens to the energy provider 275 in response to executing a workload. In another example, the token distribution information may include instructions for the orchestrator 142 to retain two tokens, the workload scheduler 146 to retain three tokens, the edge node 148 to retain one token, and the edge node 148 to distribute three tokens to the providers 225, 275.

The node scheduler 705 provides the workload description to the workload executor 710, such as a CPU. (Block 1420). In some examples, the node scheduler 705 may provide additional workload information, such as a timestamp at which to begin executing the workload. In some examples, the node scheduler 705 may generate multiple workload description portions associated with the workload description and provide the workload description portions to multiple workload executors. The workload executor(s) may be included in other edge nodes or other edge services. The node scheduler 705 may provide the workload description or a portion of a workload description to another edge node 148 or edge service 135 to be executed.

The controller 715 prompts the workload executor 710 and the energy manager 720 (e.g., a PMU) to execute the workload based on the task and the workload description. (Block 1430). The controller 715 accesses telemetry associated with the execution of the workload. (Block 1440). For example, the controller 715 may access power metrics (such as watts consumed) from the energy monitor 735 and/or performance metrics (such as processing time consumed) from the performance monitor 725. The controller 715 may also access telemetry from the providers 225, 275.

The controller 715 determines whether contract terms are met by execution of the workload. (Block 1445). The controller 715 may identify whether telemetry (e.g., power metrics accessed from the energy monitor 735) does not exceed resource terms or performance terms included in the contract. In some examples, the controller 715 may identify rates of service (such as tokens paid per watt used during execution of a workload) to be modified. For example, if a rate of service provided by the energy provider 275 exceeds a rate of service included in the contract, the controller 715 may determine that the contract terms were not met.

If the controller 715 determines that the contract terms were not met (e.g., block 1445 returns a result of NO), the controller 715 requests compensation. (Block 1450). In some examples, the controller 715 may request compensation by requesting additional tokens from the orchestrator 142 and/or the workload scheduler 146. In some examples, the controller 715 may request compensation by providing a portion of tokens included in the task to the orchestrator 142 and/or the workload scheduler 146 as a refund. Compensation terms indicating a manner in which the controller 715 requests compensation may be included in the contract. For example, a contract included in a task may include a compensation term that instructs the controller 715 to provide one token to the workload scheduler 146 in response to the execution time (i.e., the processing time used to execute a workload) exceeding a threshold. If the controller 715 determines that the contract terms were met (e.g., block 1445 returns a result of YES), control moves to the controller 715 at block 1455.

The controller 715 reports finalization of the workload to the blockchain node 144. (Block 1455). In some examples, the controller 715 may report finalization of the workload by reporting the execution of the workload to the blockchain node 144. In some examples, the controller 715 may report finalization of the workload by providing the contract to the blockchain node 144. In some examples, if the controller 715 compensates the workload scheduler 146 and/or the orchestrator 142 in response to contract terms not being met, the controller 715 may provide the compensation terms to the blockchain node 144.

The machine readable instructions described herein may be stored in one or more of a compressed format, an encrypted format, a fragmented format, a compiled fauna, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9, 10, 11, 12, 13, and 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition teen in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 15:
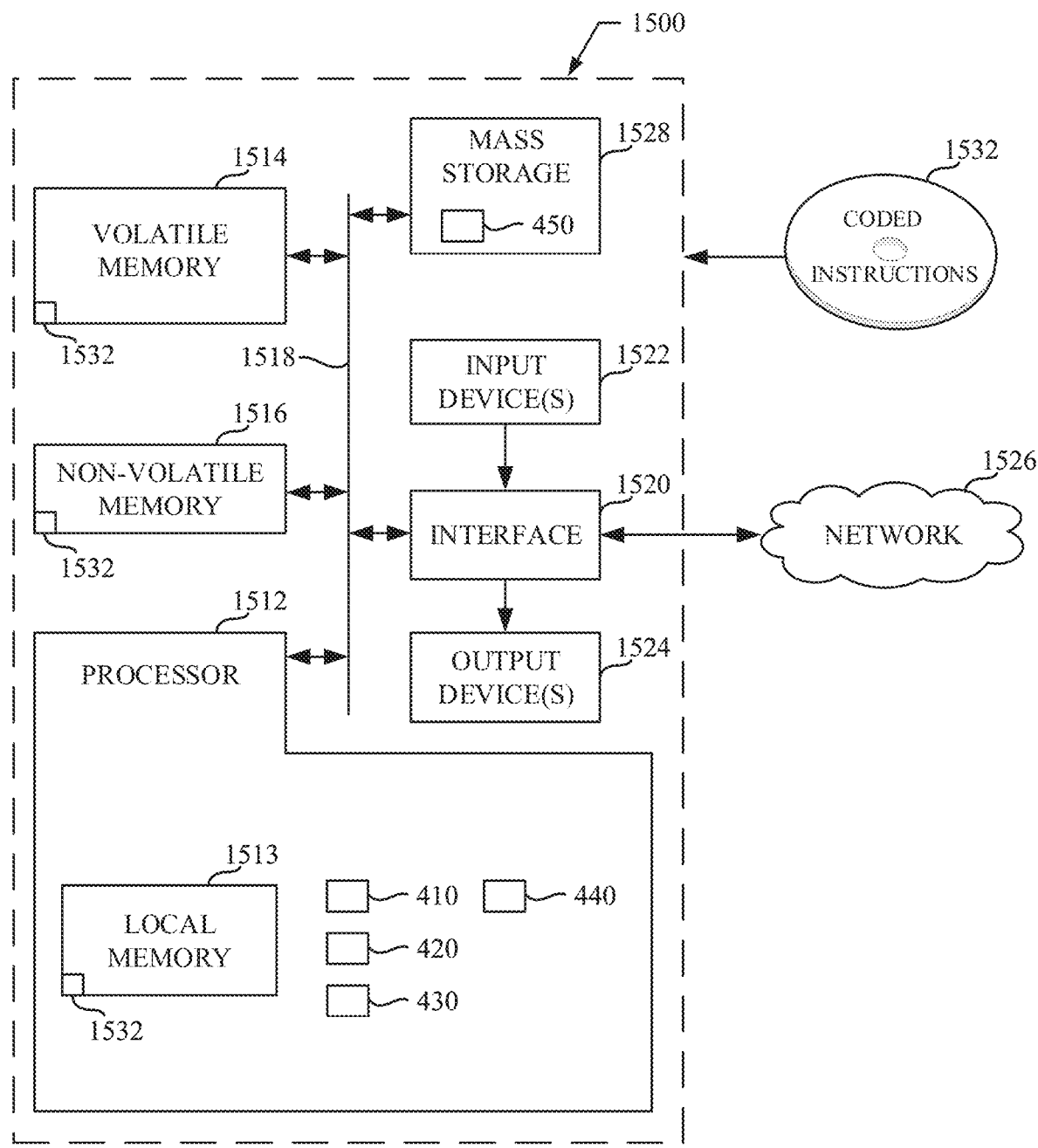
FIG. 15 is a block diagram of an example processor platform structured to execute the instructions of FIGS. 9 and/or 11 to implement the example orchestrator of FIGS. 1, 2, 3, and/or 4.

FIG. 15 is a block diagram of an example processor platform 1500 structured to execute the instructions of FIGS. 9 and/or 11 to implement the example orchestrator 142 of FIGS. 1, 2, 3, and/or 4. The processor platform 1500 can be, for example, a server, a personal computer, a workstation, a mobile device (e.g., a cell phone, a smart phone, a tablet such as an iPad™), a personal digital assistant (PDA), an Internet appliance, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the contract controller 410, the bid provider 420, the offer controller 430, and the task controller 440.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 9 and/or 11 may be stored in the mass storage device 1528, in the volatile memory 1514, in the non-volatile memory 1516, and/or on a removable non-transitory computer readable storage medium such as a CD or DVD.

Figure 16:
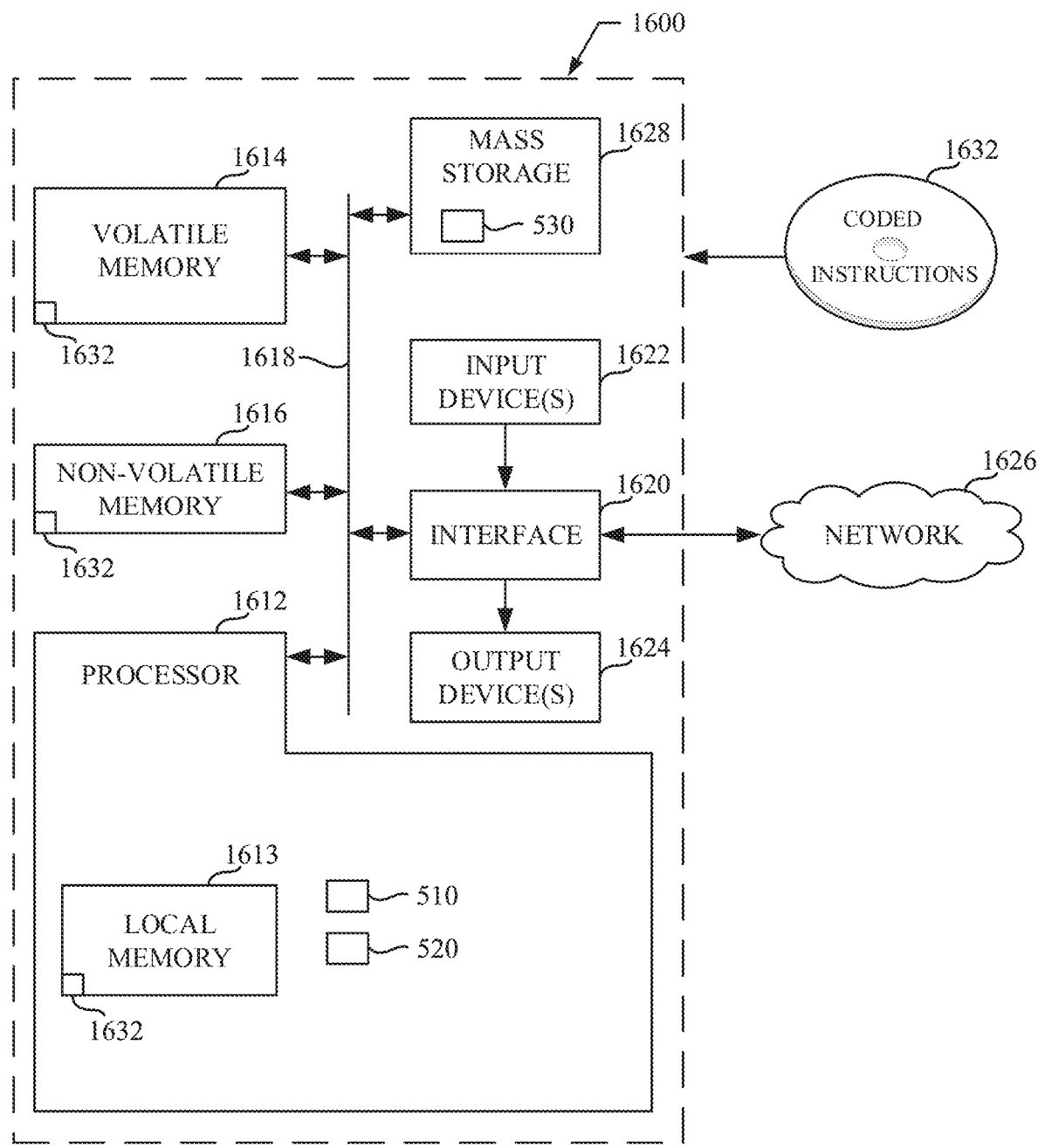
FIG. 16 is a block diagram of an example processor platform structured to execute the instructions of FIGS. 9 and/or 12 to implement the example workload scheduler of FIGS. 1, 2, 3, and/or 5.

FIG. 16 is a block diagram of an example processor platform 1600 structured to execute the instructions of FIGS. 9 and/or 12 to implement the example workload scheduler 146 of FIGS. 1, 2, 3, and/or 5. The processor platform 1600 can be, for example, a server, a personal computer, a workstation, a mobile device (e.g., a cell phone, a smart phone, a tablet such as an iPad™), a personal digital assistant (PDA), an Internet appliance, a Blu-ray player, a gaming console, a personal video recorder, a set top box, a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the task controller 510 and the results controller 520.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIGS. 9 and/or 12 may be stored in the mass storage device 1628, in the volatile memory 1614, in the non-volatile memory 1616, and/or on a removable non-transitory computer readable storage medium such as a CD or DVD.

Figure 17:
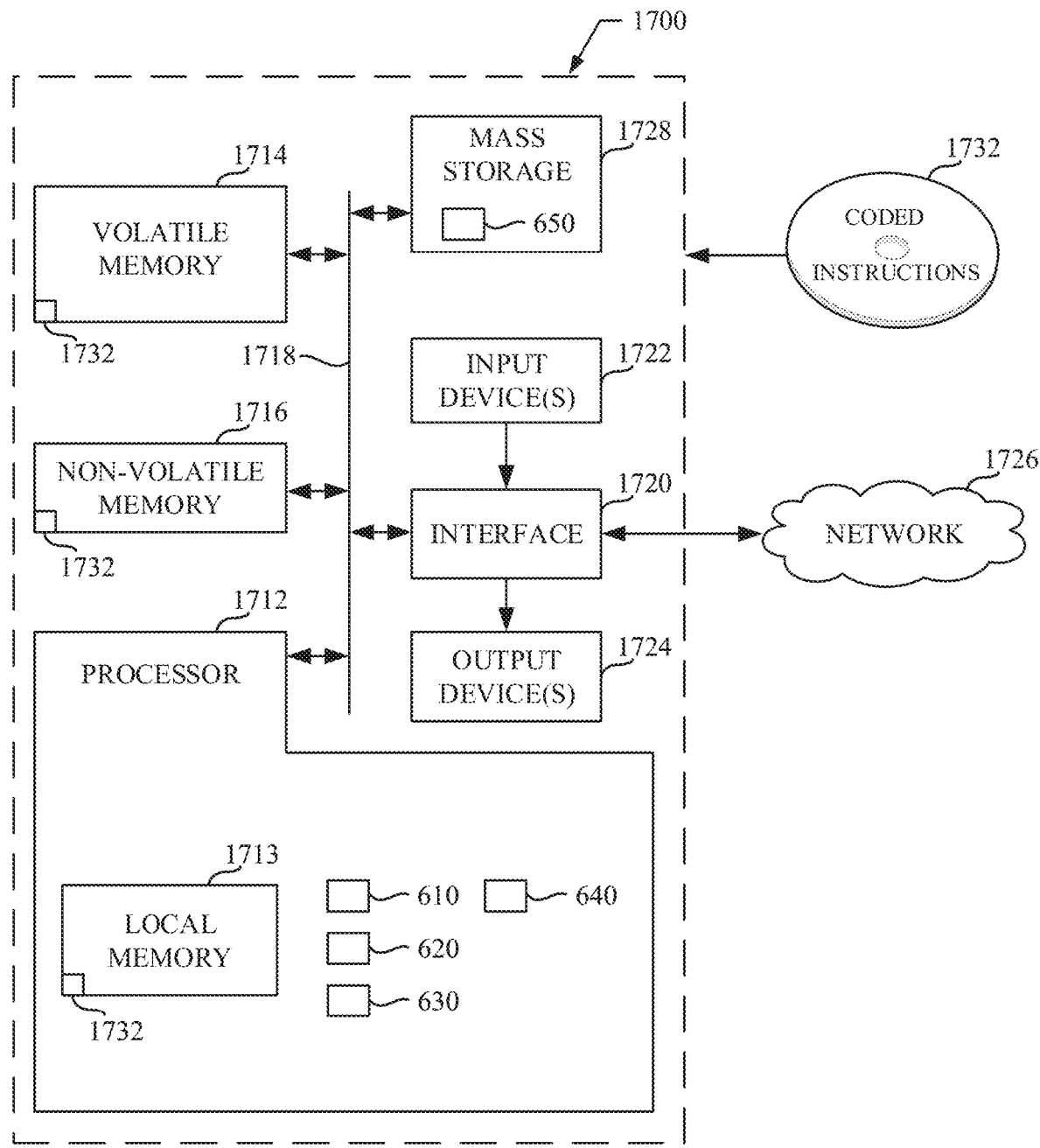
FIG. 17 is a block diagram of an example processor platform structured to execute the instructions of FIGS. 9 and/or 10 to implement the example endpoint device of FIGS. 1, 2, 3, and/or 6.

FIG. 17 is a block diagram of an example processor platform 1700 structured to execute the instructions of FIGS. 9 and/or 10 to implement the example endpoint device 165 of FIGS. 1, 2, 3, and/or 6. The processor platform 1700 can be, for example, a server, a personal computer, a workstation, a mobile device (e.g., a cell phone, a smart phone, a tablet such as an iPad™), a personal digital assistant (PDA), an Internet appliance, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the contract requestor 610, the contract accessor 620, the task controller 630, and the results controller 640.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 9 and/or 10 may be stored in the mass storage device 1728, in the volatile memory 1714, in the non-volatile memory 1716, and/or on a removable non-transitory computer readable storage medium such as a CD or DVD.

Figure 18:
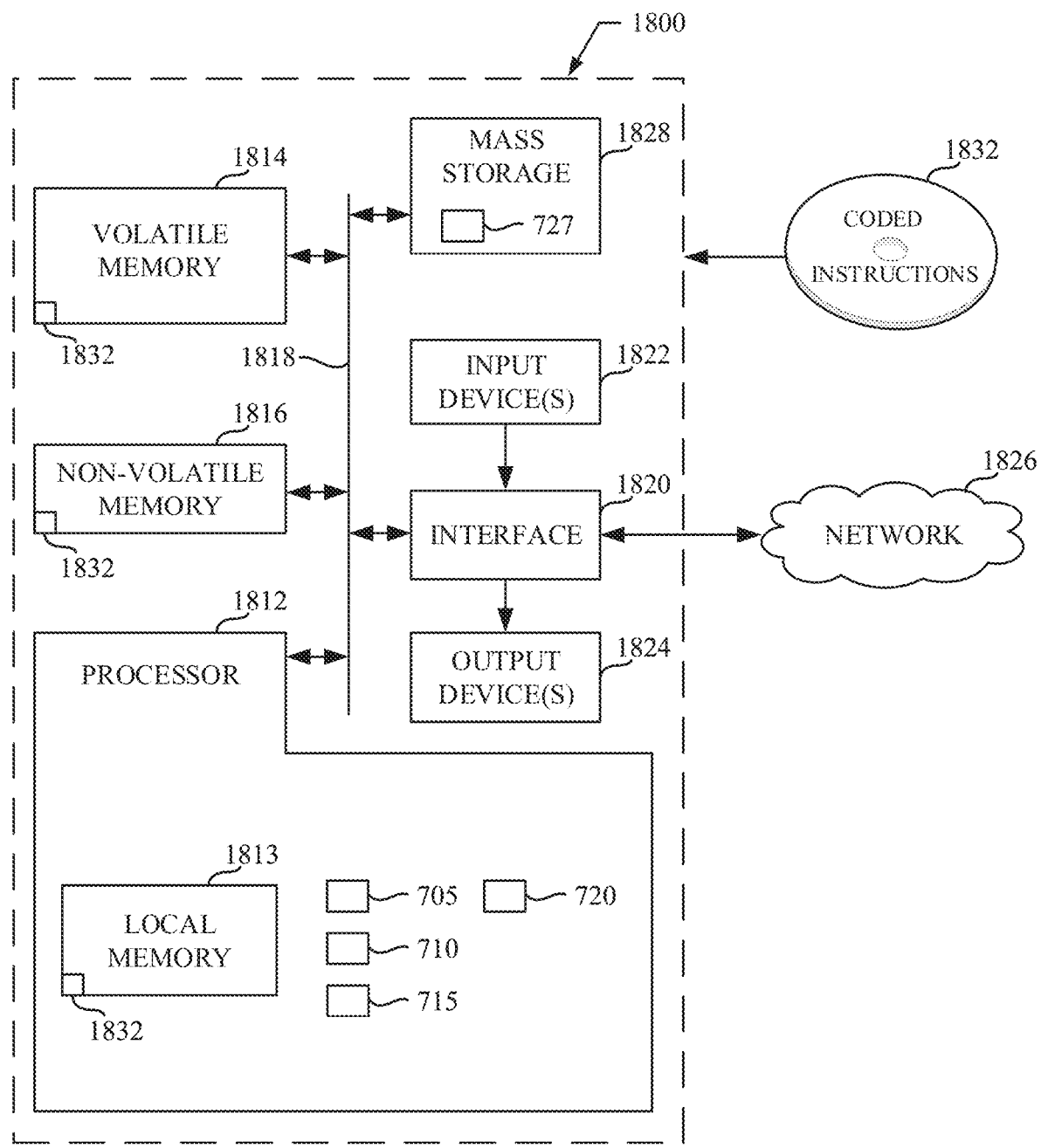
FIG. 18 is a block diagram of an example processor platform structured to execute the instructions of FIGS. 9, 13, and/or 14 to implement the example edge node of FIGS. 1, 2, 3, 7.

FIG. 18 is a block diagram of an example processor platform 1800 structured to execute the instructions of FIGS. 9, 13, and/or 14 to implement the example edge node 148 of FIGS. 1, 2, 3, and/or 7. The processor platform 1800 can be, for example, a server, a personal computer, a workstation, a mobile device (e.g., a cell phone, a smart phone, a tablet such as an iPad™), a personal digital assistant (PDA), an Internet appliance, a Blu-ray player, a gaming console, a personal video recorder, a set top box, a headset or other wearable device, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the node scheduler 705, the workload executor 710, the controller 715, and the energy manager 720.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives.

The machine executable instructions 1832 of FIGS. 9, 13 and/or 14 may be stored in the mass storage device 1828, in the volatile memory 1814, in the non-volatile memory 1816, and/or on a removable non-transitory computer readable storage medium such as a CD or DVD In some examples, the processor platform 1800 may communicate with and/or access energy from a power supply unit (PSU). The power supply unit and the processor platform 1800 may be connected to the interface circuit 1820. In some examples, a PSU may obtain energy (such as power in the form of alternating current (AC)), convert the energy into another form of energy (such as power in the form of direct current (DC)), and provide the energy to the processor platform 1800. In some examples, the power supply unit may include a second processor platform, such as a PMU, that accesses control commands provided by the processor platform 1800 and/or the energy manager 720. The power supply unit (e.g., a PMU included in the PSU) may respond to control commands by enabling, disabling, and/or modifying energy provided to the processor platform 1800 to execute a workload.

From the foregoing, it will be appreciated that example methods and apparatus have been disclosed that execute a workload in an edge environment on behalf of an endpoint device. The disclosed methods and apparatus improve the efficiency of using a computing device by enabling the computation and execution of workloads with services located closer in proximity to endpoint devices than centralized servers. Further, disclosed example methods and apparatus improve the efficiency of using a computing device by enabling a localized execution of a workload based on geographic locations and/or network topographies and by enabling the payment for computational resources as needed in a granular fashion. The disclosed methods, apparatus and articles of manufacture are accordingly directed to one or more improvement(s) in the functioning of a computer.

Example methods, apparatus, systems, and articles of manufacture to execute a workload in an edge environment are disclosed herein. Further examples and combinations thereof include the following:

Example 1 includes an apparatus to execute a workload in an edge environment, the apparatus comprising a node scheduler to accept a task from a workload scheduler, the task including a description of a workload and tokens, a workload executor to execute the workload, the node scheduler to access a result of execution of the workload and provide the result to the workload scheduler, and a controller to access the tokens and distribute at least one of the tokens to at least one provider, the provider to provide a resource to the apparatus to execute the workload.

Example 2 includes the apparatus of example 1, wherein the node scheduler is to access a bid from an orchestrator, the bid including a first workload specification and a first count of tokens, and provide an offer to the orchestrator, the offer including a second workload specification and a second count of tokens, the second workload specification and the second count of tokens based on the first workload specification and the first count of tokens.

Example 3 includes the apparatus of example 1, further including an energy manager to vary at least one of a power consumption or a clock rate of the apparatus based on the task.

Example 4 includes the apparatus of example 3, wherein the energy manager is to provide energy telemetry to the controller.

Example 5 includes the apparatus of example 1, wherein the workload executor is to provide performance telemetry to the controller.

Example 6 includes the apparatus of example 1, wherein the node scheduler is to notify receipt of the description of the workload to at least one of a blockchain node or an orchestrator, and provide the task to the workload executor.

Example 7 includes the apparatus of example 1, wherein the task includes a contract, and the controller is further to access a user context and token distribution information from the contract, prompt the workload executor to execute the workload, determine whether terms of the contract were met by the execution of the workload, in response to determining that the terms were not met, request compensation from the workload scheduler, and report the execution of the workload to a blockchain node.

Example 8 includes the apparatus of example 1, wherein the node scheduler is to notify receipt of the description of the workload to a blockchain node.

Example 9 includes the apparatus of example 1, wherein the edge environment includes a supply chain infrastructure.

Example 10 includes the apparatus of example 1, wherein the edge environment includes a Fifth Generation (5G) wireless marketplace.

Example 11 includes At least one non-transitory computer readable medium comprising instructions that, when executed, cause at least one processor to at least accept a task from a workload scheduler, the task including a description of a workload, access tokens included in the task, execute the workload, distribute at least one of the tokens to at least one provider, the provider to provide a resource to the processor to execute the workload, access a result of execution of the workload, and provide the result to the workload scheduler.

Example 12 includes the at least one non-transitory computer readable medium of example 11, wherein the instructions, when executed, cause the at least one processor to access a bid from an orchestrator, the bid including a first workload specification and a first count of tokens, and provide an offer to the orchestrator, the offer including a second workload specification and a second count of tokens, the second workload specification and the second count of tokens based on the first workload specification and the first count of tokens.

Example 13 includes the at least one non-transitory computer readable medium of example 11, wherein the instructions, when executed, cause the at least one processor to vary at least one of a power consumption or a clock rate of the processor based on the task.

Example 14 includes the at least one non-transitory computer readable medium of example 11, wherein the instructions, when executed, cause the at least one processor to provide energy telemetry.

Example 15 includes the at least one non-transitory computer readable medium of example 11, wherein the instructions, when executed, cause the at least one processor to provide performance telemetry.

Example 16 includes the at least one non-transitory computer readable medium of example 11, wherein the instructions, when executed, cause the at least one processor to notify receipt of the description of the workload to at least one of a blockchain node or an orchestrator.

Example 17 includes the at least one non-transitory computer readable medium of example 11, wherein the instructions, when executed, cause the at least one processor to access a user context and token distribution information from a contract included in the task, execute the workload, determine whether terms of the contract were met by the execution of the workload, in response to determining that the terms were not met, request compensation from the workload scheduler, and report the execution of the workload to a blockchain node.

Example 18 includes a method of executing a workload in an edge environment, the method comprising accepting a task from an edge environment, the task including a description of a workload, accessing tokens included in the task, executing the workload, distributing at least one of the tokens to at least one provider, the provider to provide a resource to execute the workload, accessing a result of execution of the workload, and providing the result to the edge environment.

Example 19 includes the method of example 18, wherein the accepting a task includes accessing a bid from the edge environment, the bid including a first workload specification and a first count of tokens, and providing an offer to the edge environment, the offer including a second workload specification and a second count of tokens, the second workload specification and the second count of tokens based on the first workload specification and the first count of tokens.

Example 20 includes the method of example 18, wherein the executing a workload includes providing energy telemetry.

Example 21 includes the method of example 18, wherein the executing a workload includes providing performance telemetry.

Example 22 includes the method of example 18, wherein the accepting a task includes notifying receipt of the workload to the edge environment.

Example 23 includes the method of example 18, wherein the executing a workload includes accessing user context and token distribution from a contract included in the task, executing the workload, determining whether terms of the contract were met by the execution of the workload, in response to determining that the terms were not met, requesting compensation from the edge environment, and reporting the execution of the workload to the edge environment.

Example 24 includes an apparatus to create a task in an edge environment, the apparatus comprising a contract controller to access a contract request from an endpoint device, the contract request associated with a task, the task including a description of a workload to be executed on behalf of the endpoint device and tokens, a bid provider to provide a bid to a plurality of edge nodes, the bid based on the contract request, an offer controller to access an offer from a first one of the edge nodes, the offer responsive to the bid, and a task controller to access the task from the endpoint device and provide the task to the first one of the edge nodes.

Example 25 includes the apparatus of example 24, wherein the contract controller is further to create a contract based on the offer, and provide the contract to the endpoint device.

Example 26 includes the apparatus of example 25, wherein the contract controller is to create a contract based on the offer and on contract terms included in the contract request.

Example 27 includes the apparatus of example 24, wherein the task includes a contract, the description of the workload, and tokens.

Example 28 includes the apparatus of example 24, wherein the bid includes a first workload specification and a first count of tokens, and the offer includes a second workload specification and a second count of tokens, the second workload specification and the second count of tokens based on the first workload specification and the first count of tokens.

Example 29 includes the apparatus of example 24 wherein the task controller is to retain a portion of the tokens before providing the task to a scheduler.

Example 30 includes an apparatus to schedule a task in an edge environment, the apparatus comprising a task controller to access a task from an orchestrator and provide the task to an edge node, the task including a description of a workload and tokens, and a results controller to access a result of execution of the workload from the edge node and provide the result to an endpoint device.

Example 31 includes the apparatus of example 30, wherein the task includes a contract, the description of the workload, and tokens.

Example 32 includes the apparatus of example 30, wherein the results controller is to retain a portion of the tokens before providing the result to the endpoint device.

Example 33 includes the apparatus of example 30, wherein the result further includes tokens.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to execute a workload in an edge environment, the apparatus comprising:
   interface circuitry;
   instructions; and
   processor circuitry to execute the instructions to:
      accept a task from a workload scheduler, the task including a description of a workload, a contract, and tokens to be accessed;
      execute the workload and determine telemetry from execution of the workload; and
      access a result of execution of the workload and provide the result to the workload scheduler; and
   a controller to:
      access the tokens;
      access user context from the contract, the user context to identify at least one of the workload scheduler or an orchestrator of the contract;
      access token distribution information from the contract, the token distribution information including information to cause the at least one of the workload scheduler or the orchestrator to retain a first one or more of the tokens prior to execution of the workload;
      distribute at least a second one or more of the tokens to at least one provider, the at least one provider to provide a resource to the apparatus to execute the workload;
      determine, based on the telemetry determined from the execution of the workload, whether a first term of the contract has been met, the first term based on at least one of workload performance, resource usage, or energy usage; and
      distribute, based on a second term of the contract, a third one or more of the tokens to the at least one of the workload scheduler or the orchestrator of the contract in response to a determination that the first term of the contract has not been met.

2. The apparatus of claim 1, wherein the processor circuitry is to:
   access a bid from the orchestrator, the bid including a first workload specification and a first count of tokens; and provide an offer to the orchestrator, the offer including a second workload specification and a second count of tokens, the second workload specification and the second count of tokens based on the first workload specification and the first count of tokens.

3. The apparatus of claim 1, wherein the processor circuitry is to provide energy telemetry to the controller.

4. The apparatus of claim 1, wherein the processor circuitry is to provide the telemetry to the controller.

5. The apparatus of claim 1, wherein the processor circuitry is to:
notify receipt of the description of the workload to at least one of a blockchain node or the orchestrator.

6. The apparatus of claim 1, wherein the controller is to:
prompt the processor circuitry to execute the workload;
determine whether a third term of the contract has been exceeded based on the telemetry of the execution of the workload, the third term based on at least one of the resource usage or the energy usage;
in response to a determination that the third term has not been met, request compensation from the workload scheduler; and
report the execution of the workload to a blockchain node.

7. The apparatus of claim 1, wherein the processor circuitry is to notify receipt of the description of the workload to a blockchain node.

8. The apparatus of claim 1, further including an energy manager to vary at least one of a power consumption or a clock rate of the apparatus based on the task.

9. The apparatus of claim 1, wherein the telemetry determined from the execution of the workload is to include at least one of a resource usage metric, an energy usage metric, or a workload performance metric.

10. At least one non-transitory computer readable medium comprising instructions that, when executed, cause at least one processor to at least:
accept a task from a workload scheduler, the task including a description of a workload and a contract;
access tokens included in the task;
access user context from the contract, the user context to identify at least one of the workload scheduler or an orchestrator of the contract;
access token distribution information from the contract, the token distribution information including information to cause the at least one of the workload scheduler or the orchestrator to retain a first one or more of the tokens prior to execution of the workload;
execute the workload;
distribute a second one or more of the tokens to at least one provider, the at least one provider to provide a resource to the processor to execute the workload;
access a result of execution of the workload;
provide the result to the workload scheduler;
determine, based on telemetry determined from the execution of the workload, whether a first term of the contract has been met, the first term based on at least one of workload performance, resource usage, or energy usage; and
distribute, based on a second term of the contract, a third one or more of the tokens to the at least one of the workload scheduler or the orchestrator of the contract in response to a determination that the first term of the contract has not been met.

11. The at least one non-transitory computer readable medium of claim 10, wherein the instructions, when executed, cause the at least one processor to:
access a bid from the orchestrator, the bid including a first workload specification and a first count of tokens; and
provide an offer to the orchestrator, the offer including a second workload specification and a second count of tokens, the second workload specification and the second count of tokens based on the first workload specification and the first count of tokens.

12. The at least one non-transitory computer readable medium of claim 10, wherein the instructions, when executed, cause the at least one processor to provide energy telemetry.

13. The at least one non-transitory computer readable medium of claim 11, wherein the instructions, when executed, cause the at least one processor to provide the telemetry.

14. The at least one non-transitory computer readable medium of claim 10, wherein the instructions, when executed, cause the at least one processor to notify receipt of the description of the workload to at least one of a blockchain node or the orchestrator.

15. The at least one non-transitory computer readable medium of claim 10, wherein the instructions, when executed, cause the at least one processor to:
determine whether a third term of the contract has been exceeded based on the telemetry of the execution of the workload, the third term based on at least one of the resource usage or the energy usage;
in response to a determination that the third term has not been met, request compensation from the workload scheduler; and
report the execution of the workload to a blockchain node.

16. The at least one non-transitory computer readable medium of claim 10, wherein the instructions, when executed, cause the at least one processor to vary at least one of a power consumption or a clock rate of the processor based on the task.

17. The at least one non-transitory computer readable medium of claim 10, wherein the instructions, when executed, cause the at least one processor to determine the telemetry from the execution of the workload is to include at least one of a resource usage metric, an energy usage metric, or a workload performance metric.

18. A method of executing a workload in an edge environment, the method comprising:
accepting a task from an edge environment, the task including a description of a workload and a contract;
accessing tokens included in the task;
accessing user context from the contract, the user context to identify at least one of a workload scheduler or an orchestrator of the contract;
accessing token distribution information from the contract, the token distribution information including information to cause the at least one of the workload scheduler or the orchestrator to retain a first one or more of the tokens prior to execution of the workload;
executing the workload;
distributing a second one or more of the tokens to at least one provider, the at least one provider to provide a resource to execute the workload;
accessing a result of execution of the workload;
providing the result to the edge environment;
determining, based on telemetry determined from the execution of the workload, whether a first term of the contract has been met, the first term based on at least one of workload performance, resource usage, or energy usage; and distributing, based on a second term of the contract, a third one or more of the tokens to the at least one of the workload scheduler or the orchestrator of the contract in response to a determination the first term of the contract has not been met.

19. The method of claim 18, wherein the accepting of the task includes:
   accessing a bid from the edge environment, the bid including a first workload specification and a first count of tokens; and
   providing an offer to the edge environment, the offer including a second workload specification and a second count of tokens, the second workload specification and the second count of tokens based on the first workload specification and the first count of tokens.

20. The method of claim 18, wherein the executing of the workload includes providing energy telemetry.

21. The method of claim 18, wherein the executing of the workload includes providing the telemetry.

22. The method of claim 18, wherein the accepting a task includes notifying receipt of the workload to the edge environment.

23. The method of claim 18, wherein the executing a workload includes:
   executing the workload;
   determining whether a third term of the contract has been exceeded based on the telemetry of the execution of the workload, the third term based on at least one of the resource usage or the energy usage;
   in response to a determination that the third term has not been met, requesting compensation from the edge environment; and
   reporting the execution of the workload to the edge environment.

24. The method of claim 18, wherein the executing a workload includes providing energy telemetry.

25. The method of claim 18, wherein the telemetry determined from the execution of the workload is to include at least one of a resource usage metric, an energy usage metric, or a workload performance metric.

* * * * *